US008799967B2

(12) United States Patent
Applegate et al.

(10) Patent No.: US 8,799,967 B2
(45) Date of Patent: Aug. 5, 2014

(54) USING VIDEO VIEWING PATTERNS TO DETERMINE CONTENT PLACEMENT

(75) Inventors: David Applegate, Maplewood, NJ (US); Aaron Archer, South Orange, NJ (US); Kyung-Wook Hwang, New York, NY (US); Vijay Gopalakrishnan, Edison, NJ (US); Seungjoon Lee, Basking Ridge, NJ (US); Kadangode K Ramakrishnan, Berkeley Heights, NJ (US); Deborah F Swayne, Summit, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 37 days.

(21) Appl. No.: 13/280,741

(22) Filed: Oct. 25, 2011

(65) Prior Publication Data
US 2013/0104175 A1 Apr. 25, 2013

(51) Int. Cl.
*H04N 7/173* (2011.01)
(52) U.S. Cl.
USPC .............. 725/87; 725/94; 725/109; 725/115
(58) Field of Classification Search
CPC ...................... H04N 21/2183; H04L 29/08702
USPC ......... 725/87, 91–94, 109–112, 114–117, 97, 725/98, 118, 119, 228, 231
See application file for complete search history.

(56) References Cited

U.S. PATENT DOCUMENTS

| | | | |
|---|---|---|---|
| 6,473,730 B1 * | 10/2002 | McKeown et al. ................ 704/9 |
| 6,973,621 B2 | 12/2005 | Sie et al. |
| 7,143,433 B1 * | 11/2006 | Duan et al. .................... 725/115 |
| 7,418,494 B2 | 8/2008 | Dahlin et al. |
| 7,584,285 B2 * | 9/2009 | Hudson et al. ................ 709/228 |
| 7,725,569 B2 | 5/2010 | Brady, Jr. et al. |
| 7,801,177 B2 | 9/2010 | Luss |
| 7,818,402 B1 | 10/2010 | Zhang |
| 7,903,652 B2 | 3/2011 | Huang et al. |
| 2009/0119455 A1 * | 5/2009 | Kisel et al. .................... 711/118 |
| 2009/0144431 A1 * | 6/2009 | Kisel et al. .................... 709/227 |
| 2010/0071012 A1 * | 3/2010 | Sofman et al. ................ 725/109 |
| 2010/0253826 A1 * | 10/2010 | Green et al. .................. 348/335 |
| 2013/0019269 A1 * | 1/2013 | Hymel ............................ 725/62 |

OTHER PUBLICATIONS

Applegate, et al. "Optimal Content Placement for a Large-Scale VoD System", ACM CoNEXT 2010.

(Continued)

*Primary Examiner* — Mark D Featherstone
*Assistant Examiner* — Michael M Nguyen
(74) *Attorney, Agent, or Firm* — Toler Law Group, PC

(57) ABSTRACT

A method includes receiving demand information for a first segment of a media content item and receiving demand information for a second segment of the media content item. The method includes assigning the first segment to a first set of distribution nodes of a media content distribution system based at least partially on the demand information for the first segment and based at least partially on a first cost function and assigning the second segment to a second set of distribution nodes of the media content distribution system based at least partially on the demand information for the second segment and based at least partially on a second cost function. The media content distribution system includes a plurality of distribution nodes and each distribution node is configured to provide media content items to at least some of a plurality of endpoints.

18 Claims, 18 Drawing Sheets

(56) References Cited

OTHER PUBLICATIONS

Vakali, et al. "Video Data Storage Policies: An Access Frequency Based Approach", Department of Informatics, Aristotle University, Thessaloniki, Greece, Computers and Electrical Engineering 28, 2002, pp. 447-464.

Shim, et al. "An Effective Data Placement Scheme to Serve Popular Video-On-Demand", Department of Computer Science, University of Minnesota, Minneaplos, MN, 1996.

Tan, et al. "Optimal Content Placement for Peer-to-Peer Video-on-Demand Systems", Department of Electrical and Computer Engineering, University of Illinois at Urbana-Champaign, Jan. 29, 2011.

Hwang, et al. "Leveraging Video Viewing Patterns for Optimal Content Placement", Viewed Feb. 21, 2011.

Cahill, et al. "Resource Management in a Shared Infrastructure Video CDN", Multimedia Computing and Networking 2007, Proceedings of SPIE, vol. 6504, 2007, SPIE Publications, pp. 65040D-1-65040D-12.

* cited by examiner

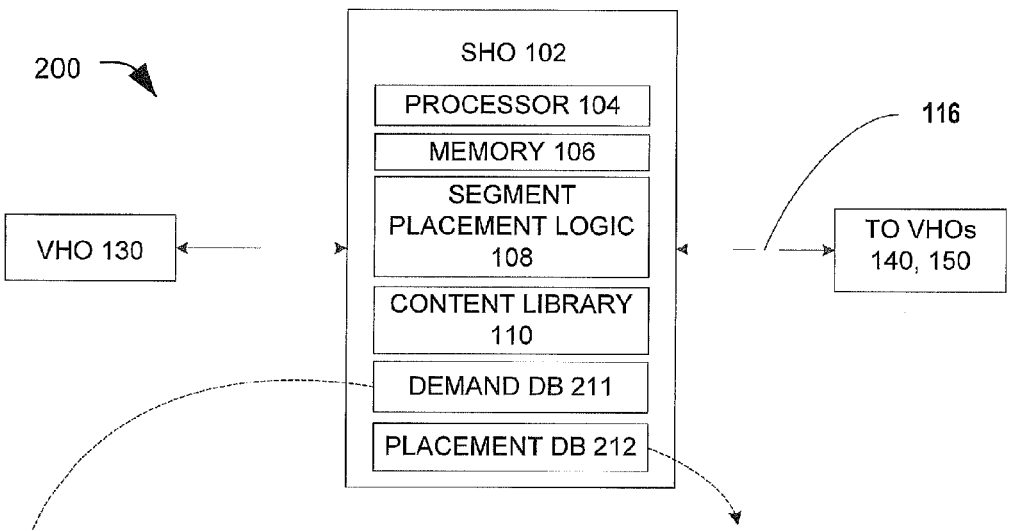

TABLE 212A

| SEGMENT ID 213 | ASSIGNMENT DATA 214 | CACHE DATA 215 |
|---|---|---|
| PREFIX 120A | VHO 140, VHO 160, VHO 170 | VHO 130 |
| SUFFIX 120B | VHO 160 | VHO 140, VHO 170 |
| PREFIX 122A | VHO 140 | VHO 150 |
| SUFFIX 122B | VHO 140 | VHO 150 |
| SUFFIX 122C | VHO 160, VHO 170 | VHO 130 |
| PREFIX 124A | VHO 160, VHO 170 | |
| SUFFIX 124 B | VHO 170 | VHO 160 |
| SEGMENT 126A | VHO 140, VHO 170 | VHO 130 |

TABLE 211A

| SEGMENT ID 216 | DEMAND INFORMATION 217 | DEMAND FORECAST 218 |
|---|---|---|
| PREFIX 120A | DATA 220 | DATA 222 |
| SUFFIX 120B | DATA 224 | DATA 226 |
| PREFIX 122A | DATA 228 | DATA 230 |
| SUFFIX 122B | DATA 232 | DATA 234 |
| SUFFIX 122C | DATA 236 | DATA 238 |
| PREFIX 124A | DATA 240 | DATA 242 |
| SUFFIX 124 B | DATA 244 | DATA 246 |
| SEGMENT 126A | DATA 248 | DATA 250 |

FIG. 2

USING VIDEO VIEWING PATTERNS TO DETERMINE CONTENT PLACEMENT

FIELD OF THE DISCLOSURE

The present disclosure is generally related to placement of content in nodes of a network.

BACKGROUND

With the rapid growth of on-demand viewing of video and audio content, streaming accounts for an increasing proportion of the traffic on the Internet. Content providers have adopted approaches to handle the increase in demand for content, including use of content distribution networks, peer-to-peer based delivery networks, and combinations thereof.

These approaches typically store full copies of a video library in multiple locations of a distribution network. Storing full copies of the video library in multiple locations requires considerable storage space at each of the multiple locations. As new content is added to video libraries, the storage space required to store the video libraries increases, leading to increased storage costs and inefficient content distribution.

BRIEF DESCRIPTION OF THE DRAWINGS

FIG. 2 illustrates further details of certain components of the content distribution system of FIG. 1;

DETAILED DESCRIPTION

Figure 1:
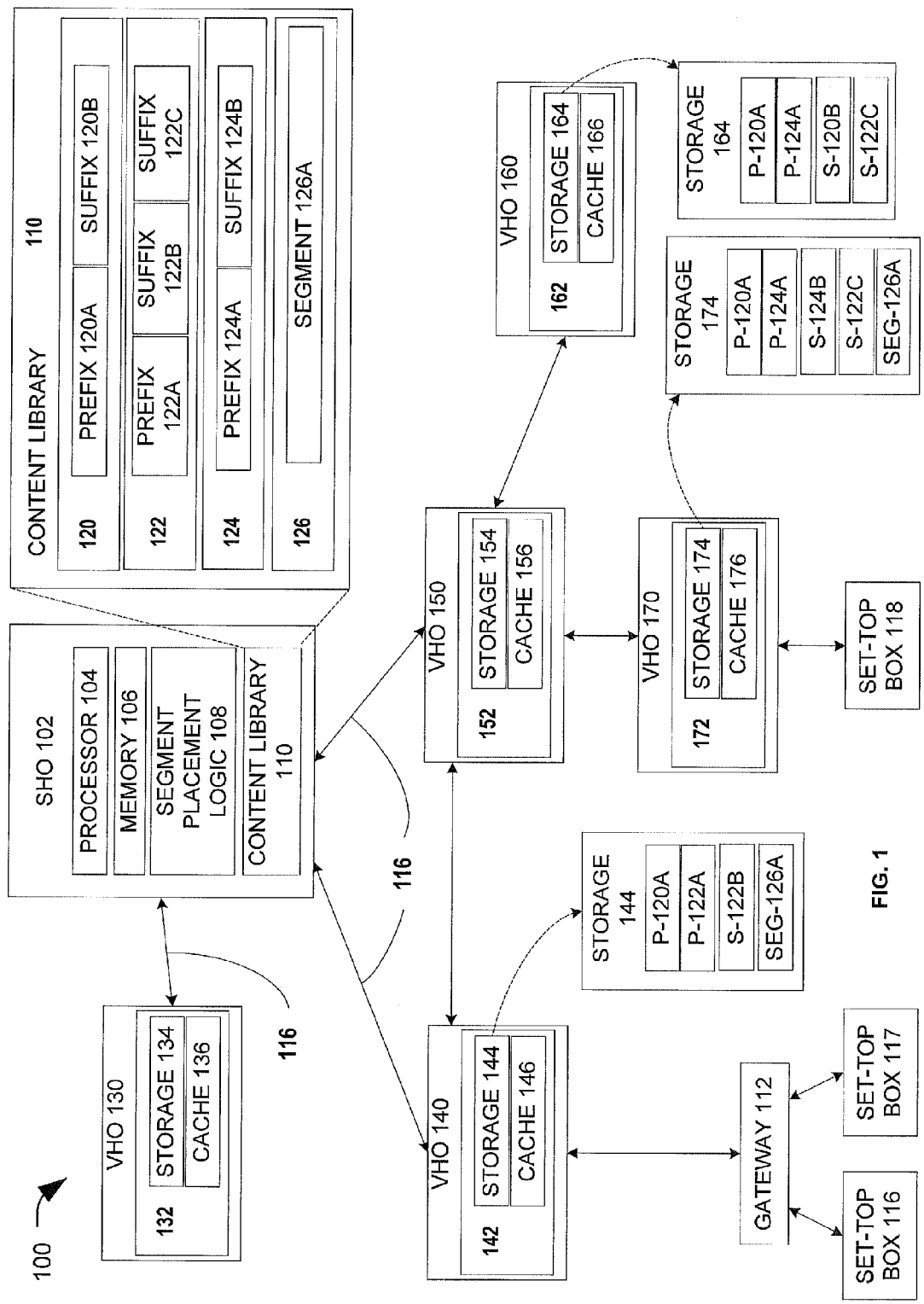
FIG. 1 is a diagram of a particular embodiment of an architecture of a content distribution system.

Many viewers of video on demand content watch only a portion of a requested media content item. Accounting for these viewing patterns with respect to the media content items may lead to a more efficient approach to placement of the media content items within a media content distribution system. To illustrate, a particular viewing pattern may indicate that viewers typically abandon viewing of a particular media content item after viewing a certain portion of the particular media content item. To account for the particular viewing pattern, a first segment (e.g., a prefix segment) of a particular media content item may be created and placed within the media content distribution system. The first segment may correspond to the portion (or a sub-portion) of the particular media content item identified in the particular viewing pattern as likely being viewed (based on statistics) by viewers before abandonment. One or more additional segments, such as a second segment (e.g., a suffix segment), of the particular media content item may also be created and placed within the media content distribution system based on the particular viewing pattern. Each segment may be placed within the media content distribution system independently of the placement of the other segments within the media content distribution system. Alternately, dependency relationships identified based on the particular viewing pattern may be accounted for in placement of all the segments. While many of the embodiments described herein are described in terms of a prefix segment and a suffix segment, it should be understood that a media content item may be divided into more than two segments and that use of the terms prefix segment and suffix segment is for ease of description only and is not intended to indicate that only two segments are present. Additionally, it should be understood that each segment of a media content item may be placed within a media content distribution system independently of the other segments of the media content item.

The above method may be used to identify and place first segments and additional segments of multiple media content items at different locations within the media content distribution network. The placement of these segments is determined based on user demand information and based on a cost function. In this manner, those segments of media content items that have a higher demand are stored at locations of the media content distribution network to support such demand while taking network costs into consideration.

In a particular embodiment, a computer-implemented method includes receiving demand information for a first segment of a media content item and receiving demand information for a second segment of the media content item. The first segment and the second segment are distinct and the demand information for the first segment is different than the demand information for the second segment. The computer-implemented method further includes assigning the first segment to a first set of distribution nodes of a media content distribution system based at least partially on the demand information for the first segment and based at least partially on a first cost function. The media content distribution system includes a plurality of distribution nodes and provides media content on demand to a plurality of endpoints. Each of the distribution nodes is coupled to a subset of the endpoints. The method further includes assigning the second segment to a second set of distribution nodes of the media content distribution system based at least partially on the demand information for the second segment and based at least partially on a second cost function. The second set of distribution nodes includes a different number of distribution nodes than the first set of distribution nodes. In a particular embodiment, the media content item may be divided into more than two segments. In this embodiment, each segment of the media content item may be assigned to one or more distribution nodes.

In another embodiment, a system includes a processor and a memory accessible to the processor. The memory includes instructions that, when executed by the processor, cause the processor to receive demand information for a first segment of a media content item. The memory further includes instructions that, when executed by the processor, cause the processor to receive demand information for a second segment of the media content item. The first segment and the second segment are distinct, and the demand information for the first segment is different than the demand information for the second segment. The memory further includes instructions that, when executed by the processor, cause the processor to assign the first segment to a first set of distribution nodes of a media content distribution system based at least partially on the demand information for the first segment and based at least partially on a first cost function. The media content distribution system includes a plurality of distribution nodes and provides media content on demand to a plurality of endpoints. Each of the distribution nodes is coupled to a subset of the endpoints. The memory further includes instructions that, when executed by the processor, cause the processor to assign the second segment to a second set of distribution nodes of the media content distribution system based at least partially on the demand information for the second segment and based at least partially on a second cost function. The second set of distribution nodes includes a different number of distribution nodes than the first set of distribution nodes.

In another embodiment, a non-transitory computer-readable medium includes instructions that, when executed by a processor, cause the processor to access demand information for a first segment of a media content item and access demand information for a second segment of the media content item. The first segment and the second segment are distinct and the demand information for the first segment is different than the demand information for the second segment. The instructions are further executable by the processor to assign the first segment to a first set of distribution nodes of a media content distribution system based at least partially on the demand information for the first segment and based at least partially on a first cost function. The media content distribution system includes a plurality of distribution nodes and provides media content on demand to a plurality of endpoints. Each of the distribution nodes is coupled to a subset of the endpoints. The memory further includes instructions that, when executed by the processor, cause the processor to assign the second segment to a second set of distribution nodes of the media content distribution system based at least partially on the demand information for the second segment and based at least partially on a second cost function. The second set of distribution nodes includes a different number of distribution nodes than the first set of distribution nodes.

Referring to FIG. 1, a particular illustrative embodiment of a media content distribution system 100 is shown. The media content distribution system 100 includes a super headend office (SHO) 102 and a plurality of video headend offices (VHOs) 130, 140, 150, 160, 170. The SHO 102 may be coupled to the VHOs 130-170 via communication links 116. The communication links 116 may be implemented using wired and/or wireless connections via one or more networks. Additionally, one or more of the VHOs 130-170 may be communicatively coupled to another VHO (e.g., VHO 140, 150) using wired and/or wireless connections via one or more networks. The VHOs 130-170 may act as distribution nodes of the media content distribution system 100. Thus, each of the VHOs 130-170 may include memory (such as disks 132, 142, 152, 162 and 172) to store media content items that the VHOs 130-170 can provide to one or more set-top boxes 116-118 on demand.

The SHO 102 may include or have access to segment placement logic 108. For example, the SHO 102 may include or have access to a processor 104 that is operable to execute logic (e.g., computer-executable instructions) to implement one or more portions of a computer-implemented method of placing content within the media content distribution system 100. For example, the segment placement logic 108 may include computer-executable instructions, and the processor 104 may execute the instructions associated with the segment placement logic 108. Further, the processor 104 may be communicatively coupled to a memory 106 and may be operable to implement instructions stored in the memory 106. For example, the segment placement logic 108 may include instructions stored in the memory 106 and executable by the processor 104.

The SHO 102 may also include or have access to a content library 110. The content library 110 may include a plurality of media content items, such as media content items 120-126. The media content items 120-126 may include video on demand content accessible to users of the media content distribution system 100. For example, the media content distribution system 100 may be a portion of a cable, satellite, or internet protocol television service of a service provider. Each of the media content items 120-126 may include one or more segments. Each segment may correspond to a portion of a particular media content item. For example, a first prefix segment 120A may correspond to a first portion of a first media content item 120 and a first suffix segment 120B may correspond to a second portion of the first media content item 120. Similarly, a second prefix segment 122A may correspond to a first portion of a second media content item 122, a second suffix segment 122B may correspond to a second portion of the second media content item 122, and a third suffix segment 122C may correspond to a third portion of the second media content item 122. A third prefix segment 124A may correspond to a first portion of a third media content item 124 and a fourth suffix segment 124B may correspond to a second portion of the third media content item 124. One or more of the media content items, such as a fourth media content item 126 may be distributed as a single segment, such as the fifth segment 126A. For example, a particular media content item may be assigned as a single segment (i.e., as a whole) to one or more distribution nodes in response to a determination that the media content item is smaller than a threshold size. Alternatively, or in addition, historical demand data may be used to determine whether the particular media content item is assigned as a single segment or as more than one segment. The segment placement logic 108 may assign each of the segments to one or more distribution nodes of the media content distribution system 100.

While the content library 110 is shown in FIG. 1 as including four media content items 120, 122, 124, 126, the content library 110 may include more than 4 media content items. For example, the content library 110 may include thousand or even millions of media content items. Additionally, while the media content distribution system 100 is shown in FIG. 1 as including 5 distribution nodes (e.g., VHOs 130-170), the media content distribution system 100 may include more than 5 distribution nodes.

The segment placement logic 108 may determine the placement of the content within the media content distribution system 100 according to a determined schedule (e.g., daily, weekly, monthly, etc.) or in response to occurrence of an event (e.g., a user request, receipt of new content, etc.). The segment placement logic 108 may assign each segment of a particular media content item of the content library 110 to one or more of the distributions nodes (e.g., VHOs 130-170) independently of placement of other segments of the particular media content item. For example, the segment placement logic 108 may assign the first prefix segment 120A independently of an assignment of the first suffix segment 120B. In a particular embodiment, the segment placement logic 108 may account for placement of a first segment of a particular media content item during placement of a second segment of the particular media content item. For example, the segment placement logic 108 may preferentially assign the first suffix segment 120B to at least one distribution node to which the first prefix segment 120A is assigned. Put another way, the first suffix segment 120B may be assigned to a subset of distribution nodes to which the first prefix segment 120A is assigned.

The disk (e.g., one of disks 132, 142, 152, 162 and 172) of a particular distribution node may be used to store media content segments. The term disk is used herein to refer to any type of memory or a combination of types of computer-readable memory. For example, the disk 132 may include one or more hard disk drives, other computer-readable media, or any combination thereof. The disk at each of the distribution nodes may be partitioned into a storage partition and a cache partition. For example, the disk 132 may be partitioned into a storage partition 134 and a cache partition 136. Partitioning the disk may refer to logically assigning portion of a single memory device or a single set of memory devices to particular uses. However, partitioning may also be accomplished by providing memory device that are dedicated to particular uses.

As explained above, the segment placement logic 108 assigns each segment of the video content library 110 to one or more distribution nodes (e.g., VHOs 130-170). Segments assigned to a particular distribution node by the segment placement logic 108 are stored by the particular distribution node at the storage partition of the disk at the particular distribution node. For example, the VHO 140 includes the disk 142 that is partitioned into a storage partition 144 and a cache partition 146. The storage partition 144 stores a copy of the first prefix segment 120A, the second prefix segment 122A, the second suffix segment 122B, and the segment 126A. The VHO 160 includes the disk 162 partitioned into a storage partition 164 and a cache partition 166. The storage partition 164 may store the first prefix segment 120A, the third prefix segment 124A, the first suffix segment 120B, and the fourth suffix segment 122C. The VHO 170 includes the disk 172 that is partitioned into a storage partition 174 and a cache partition 176. The storage partition 174 stores the first prefix segment 120A, the third prefix segment 124A, the fourth suffix segment 124B, the third suffix segment 122C, and the segment 126A.

The cache partition at a particular distribution node may also be used to store segments associated with media content items (e.g., media content items 120-126). For example, the cache partition 146 may include segments of media content that are not assigned to the second VHO 140 but that have recently been requested by one of the set-top boxes 116 and 117 served by the second VHO 140.

Segments may be downloaded or made accessible to a particular distribution node by one or more additional distribution nodes in response to a request to access a particular segment that is not stored at the disk of the particular distribution node. For example, a particular VHO may receive a request to access a particular segment from a particular endpoint (e.g. one of the set-top box devices 116-118). If the particular segment was not assigned to the particular VHO (i.e., by the segment placement logic 108) the particular segment is not stored at the storage partition of the disk at the particular VHO. If the particular segment is also not stored in the cache partition of the disk at the particular VHO, the particular VHO may initiate a transfer or download of the segment from another VHO. The particular segment is then stored at the particular VHO at the cache partition of the disk of the particular VHO. The cache partition may not have enough storage space to store the particular segment. In response to a determination that additional storage space is needed at the cache partition of the disk at the particular VHO, a least recently used (LRU) strategy may be used to determine one or more segments to eject from the cache partition. To illustrate, a first set-top box 116 may request the second suffix segment 120B from the second VHO 140. Since the second suffix segment 120B is not assigned to the second VHO 140, the storage partition 144 of the second VHO 140 does not have a copy of the second suffix segment 120B. Thus, the second VHO 140 may access a copy of the second suffix segment 120B from another VHO that has a copy of the second suffix segment 120B, such as a third VHO 150. When the second VHO 140 receives the copy of the second suffix segment 120B, the second VHO 140 may store the copy of the second suffix segment 120B at the cache partition 146 of the second VHO 140.

One or more of the VHOs 130-170 may be coupled to a gateway, such as a gateway 112 which is coupled to one or more set-top box devices (e.g., such as the set-top boxes 116 and 117. The set-top box devices 116-118 may request access to the media content items of the content library 110 on demand. Requests may be transmitted from a particular set-top box device to a VHO that is coupled to and serves the set-top box device. In response to the request received from the particular set-top box device, the VHO may determine whether the requested media content item is stored within the disk at the VHO in either the storage partition or the cache partition. For example, set-top box device 116 may transmit a request access to the first prefix segment 120A of the first media content item 120 to the VHO 140. The VHO 140 may determine whether or not the requested first prefix segment 120A is stored in the storage partition 144 or the cache partition of the disk 142. In the example shown in FIG. 1, the storage partition 144 includes the first prefix segment 120A. In response to determining that the prefix segment 120A is stored at the storage partition 144, the VHO 140 may serve the first prefix segment 120A to the set-top box device 116 via the content distribution network 116.

If the VHO determines that one or more segments associated with the requested media content item are stored in the cache partition of the disk at the VHO, the VHO may serve the one or more segments to the set-top box device. If a VHO receives a request from a set-top box device and the VHO determines that one or more segments associated with the requested media content item is not stored in either the storage partition or the cache partition of the disk at the VHO, the VHO may request a transfer of the one or more segments associated with the requested media content item from another VHO. For example, the set-top box device 117 may transmit a request to the VHO 140 requesting access to the third prefix segment 124A associated with third media content item 124. In response to the request, the VHO 140 may determine whether or not the requested segment is stored in the storage partition 144 of disk 142. In the example shown in FIG. 1, the requested segment is not stored at the storage partition 144 of disk 142. In response to a determination that the requested segment is not stored in the storage partition 144, the VHO 140 may determine whether the requested segment is stored in the cache partition 146 of disk 142. If VHO 140 determines that the requested segment is stored within the cache partition 146, the VHO 140 may serve the requested segment to the set-top box device 117. If VHO 140 determines that the requested segment is not stored within the cache partition 146, the VHO 140 may request the content item from another VHO (e.g., the VHO 150). In response to the request, the VHO 140 may receive data corresponding to the requested segment from the VHO 150. The VHO 140 may store the data in the cache partition 146 of disk 142 and may serve the requested segment to the set-top box device 117.

During operation the segment placement logic 108 may receive demand information for the first segment of a media content item (e.g., media content item 120). The first segment may correspond to a prefix segment (e.g., the first prefix segment 120A) or to a suffix segment (e.g., the first suffix segment 120B). The segment placement logic 108 may also receive demand information for a second segment (e.g., the first suffix segment 120B) of the media content item. The first segment and second segment are distinct and the demand information for the first segment is different than the demand information for the second segment.

The segment placement logic 108 may assign the first segment to a first set of distribution nodes of the media content distribution system 100. For example, the first prefix segment 120A may be assigned to the VHOs 140, 160, 170 as shown in FIG. 1. The first segment may be assigned to the first set of distribution nodes based at least partially on the demand information for the first segment and based at least partially on a first cost function, such as a mixed integer program (MIP) model, as described further below. As shown in FIG. 1, the media content distribution system 100 may provide media content on demand to a plurality of end points (e.g., set-top box devices 116-118). Each of the distribution nodes is coupled to a subset of the end points.

The segment placement logic 108 may assign the second segment to a second set of distribution nodes of the media content distribution system 100. For example, the first suffix segment 120B may be assigned to the VHO 160, as shown in FIG. 1. The second segment may be assigned to the second set of distribution nodes based at least partially on the demand information for the second segment and based at least partially on a second cost function, such as the MIP model described further below. The second set of distribution nodes may include a different number of distribution nodes than the first set of distribution nodes based on the demand information for the first segment being different that the demand information for the second segment.

The segment placement logic 108 may further determine a demand forecast for the first segment based on the demand information for the first segment. The demand forecast for the first segment may include a demand value for the first segment. The demand information for the first segment may include historical demand information for the first segment. The historical demand information for the first segment may be gathered by the media content distribution system 100 over a period of time (e.g., a past week, a past month, a past year, or any combination thereof). In a particular embodiment, the demand value for the first segment may be based on a number of requests to access the first segment received during the time period. The number of requests to access the first segment may be determined based on the demand information for the first segment, the historical demand information for the first segment, information received from another system/source (e.g., a trace application (not shown) or a server (not shown) of the media content distribution system 100), market projections, other demand prediction systems, or any combination thereof.

The segment placement logic 108 may further determine a demand forecast for the second segment based on the demand information for the second segment. The demand forecast for the second segment may include a demand value for the second segment. The demand information for the second segment may include historical demand information for the second segment. The historical demand information for the second segment may be gathered by the media content distribution system 100 over the period of time. In a particular embodiment, the demand value for the second segment may be based on a number of requests to access the second segment received during the time period. The number of requests to access the second segment may be determined based on the demand information for the second segment, the historical demand information for the second segment, information received from another system/source, or any combination thereof.

While a single period of time is referenced, the demand information and historical demand information may cover various time periods. For example, a media content item may have been added to the content library 110 for one year while another media content item may have been added to the content library 110 for only one week. The media content item may have available demand information and historical demand information for a one year time period while the other media content item may have available demand information and historical demand information for only a one week time period. Further, the segment placement logic 108 may use only a portion of the available demand information and the available historical demand information (e.g., only demand information and historical demand information for a past number of hours, days, weeks, months, years, or any combination thereof) when determining where to assign a particular segment based on configuration, implementation, and system settings.

The segment placement logic 108 may determine a value of the first cost function for the first segment using a mixed integer program (MIP) model. The segment placement logic 108 may also determine a value of the second cost function for the second segment using the MIP model. As explained above, the first segment may be assigned by the segment placement logic 108 to the first set of distribution nodes based at least partially on the demand value for the first segment and based at least partially on the value of the first cost function, and the second segment may be assigned by the segment placement logic 108 to the second set of distribution nodes based at least partially on the demand value for the second segment and based at least partially on the value of the second cost function. In a particular embodiment, the first cost function and the second cost function may be the same.

In another particular embodiment, the first cost function and the second cost function may be different. For example, the first cost function may be a cost function used to assign one or more prefix segments. The second cost function may be a cost function used to assign one or more suffix segments. Each suffix segment may be associated with a prefix segment. For example, the prefix segment may correspond to an initial viewable (or audible) portion of a media content item, and the suffix segment may correspond to a viewable (or audible) portion of the media content item following the prefix segment. Further, a suffix segment may be "a prefix segment" to an additional suffix segment such that the additional suffix segment corresponds to a viewable (or audible) portion of the media content item following the suffix segment (i.e., "the prefix segment"). Thus, the first set of distribution nodes and a second set of distribution nodes may include different numbers of distribution nodes based on the assignment of the first segment being independent of the assignment of the second segment. The first and second sets of distribution nodes may include the same number of distribution nodes depending on calculations performed by the segment placement logic 108. Thus, the first set of distribution nodes and the second set of distribution nodes may include the same set of distribution nodes, different sets of distribution nodes, or may have some distribution nodes in common and other distribution nodes that are not in common.

In a particular embodiment, the second cost function may include or account for one or more additional constraints that are not included in or accounted for by the first cost function. In this embodiment, the first cost function may enable the segment placement logic 108 to assign a prefix segment associated with a media content item to any distribution node within the media content distribution system 100. The one or more additional constraints of the second cost function may cause the segment placement logic 108 to assign a suffix segment associated with the media content item to a second set of distribution nodes that includes at least one distribution node from the first set of distribution nodes. Thus, the second set of distribution nodes includes at least one node that is also included in the first set of distribution nodes. The second set of distribution nodes may also include one or more distribution nodes that are not in the first set of distribution nodes.

In another particular embodiment, the one or more additional constraints of the second cost function may include a constraint that causes the segment placement logic 108 to assign a suffix segment associated with the media content item to a subset of the distribution node where a prefix segment associated with the suffix segment has been assigned. In this embodiment, each distribution node storing a suffix segment also stores a prefix segment associated with the suffix segment, but each distribution node storing a prefix segment may or may not also store a suffix segment associated with the prefix segment. Thus, the second set of distribution nodes may be a subset of the first set of distribution nodes.

The segment placement logic 108 may assign a third segment to a third set of distribution nodes of the media content distribution system 100 based on demand information for the third segment and based at least partially on a third cost function. In a particular embodiment, the third segment may be associated with a second media content item that is distinct from the media content item associated with the first segment and the second segment. In another particular embodiment, the third segment may be another portion of the media content item associated with the first and second segment. As described above with reference to the first cost function and the second cost function, the third cost function may be the same as the first cost function and the second cost function, distinct from the first cost function, distinct from the second cost function, or a combination thereof. Additionally, a media content item may be segmented into more than three segments. Thus, the segment placement logic 108 may assign more than three segments associated with a single media content item to distribution nodes of the media content distribution system 100. Each of the three or more segments may be assigned independently of the other segments. Alternately, two or more of the segments may be assigned subject to a constraint that causes the segment placement logic 108 to assign one of the segments to a subset of distribution nodes to which another of the segments is assigned.

In a particular embodiment, a first segment may be assigned to the first set of distribution nodes and a second segment may be assigned to a second set of distribution nodes based at least partially on an estimated peak demand of the media content distribution system 100. For example, the first segment may be assigned to a first set of distribution nodes based at least partially on an estimated peak demand of the media content distribution system 100 for the first segment. The second segment may be assigned to a second set of distribution nodes based at least partially on an estimated peak demand of the media content distribution system 100 for the second segment.

In a particular embodiment the size of the segments is determined based on the demand information for the particular media content segment. The MIP model used in a particular embodiment may be subject to constraints of the media content distribution system 100, such as storage constraints of the distribution nodes, link bandwidth constraints of the media content distribution system 100, demand forecasts for particular content segments, other constraints, or a combination thereof.

Thus, the media content distribution system 100 may assign a plurality of segments associated with a plurality of media content items to a plurality of distribution nodes. Further, each of the segments may be assigned to a set of the distribution nodes based at least partially on demand information for each of the segments and based at least partially on one or more cost functions. The one or more cost functions may utilize at least part of the demand information to determine a demand for a particular segment associated with a particular media content item and to determine a particular set of distribution nodes where the particular segment should be placed. Additionally, the particular segment may be assigned to the particular set of distribution nodes independently of one or more additional segments associated with the particular media content item. Optionally, the one or more cost functions may account for dependent relationships between a first segment and one or more additional segments associated with a media content item based on configuration, implementation, and system setting.

Referring to FIG. 2, another particular embodiment of the media content distribution system 100 of FIG. 1 is shown and designated 200. Elements of FIG. 2 that are numbered the same as elements in FIG. 1 operate similarly to the corresponding elements of FIG. 1, as described above. In FIG. 2, the SHO 102 includes or has access to a demand database 211 and a placement database 212. Additionally, the SHO 102 is coupled to the VHOs 130, 140 and 150 as shown in FIG. 1. Not all of the communication links and distribution nodes shown in FIG. 1 are included in FIG. 2 in order to simplify FIG. 2.

The demand database 211 may store demand information 217 for each media content item of the content library 110. In a particular embodiment, the demand information 217 may include data associated with each of the media content items. In another particular embodiment, the demand information 217 may include data associated with each segment of each of the media content items included in the content library 100. The demand information 217 for a particular segment associated with a particular media content item may include data associated with one or more additional segments associated one or more additional media content items. For example, data 220 may include demand data for the first prefix segment 120A associated with the media content item 120. The media content item 120 may be associated with one or more attributes (e.g. a particular genre of a plurality of genres, a viewing length, a director, an actor, a release date, etc.). The data 220 may include data associated with segments of additional media content items that share the same or similar attributes with the first prefix segment 120A or the media content item 120. To illustrate, the media content item 120 may be a movie of a particular genre and the data 220 may include data associated with one or more additional segments or additional media content items that are of the particular genre.

The demand database 211 is illustrated by a Table 211A that includes a segment identifier 216, historical demand data 217, and demand forecast data 218. The segment identifier 216 may be a unique identifier (e.g., a primary key) that identifies information associated with a particular segment (e.g., a particular entry or row of the Table 211A) within the demand database 211. Thus, the segment identifier 216 may be an identifier that is uniquely associated with a particular segment of a particular media content item. For example, Table 211A includes an entry for the first prefix segment 120A. The first prefix segment 120A may be a unique identifier that identifies a part of the first media content item 120.

The demand information 217 may include demand information as described above, such as a number of requests to access a particular segment that were received by the media content distribution system 200 over a previous period of time. As explained above, the demand information 217 for the first segment may be collected by the media content distribution system 200 over a period of time (e.g., a past week, a past month, a past year, or any combination thereof). Further, the demand information 217 may be received at the SHO 102 from another system/source (e.g., a trace application (not shown) or server (not shown) of the media content distribution system 200), or any combination thereof.

The demand database 211 may delete or remove at least a portion of the demand information 217 after a threshold period of time has passed (e.g., one year) based on configuration, implementation, and system settings. The demand information 217 received at the SHO 102 may be stored in an appropriate entry of the demand database 211 based on the unique segment identifier 216.

As explained above, the segment placement logic 108 may determine a demand forecast (e.g., an estimate of future demand) for a first segment (e.g., the first prefix segment 120A) based on demand information associated with the first segment (e.g., the data 220). For example, the demand information associated with the first segment (e.g., the data 220) may include a number of requests to access the first segment that were received by the media content distribution system 200 or by another system/source during a previous period of time. The demand forecast for the first segment may indicate a forecasted number of requests to access the first segment during a future period of time (e.g., a next minute, a next hour, a next day, a next week, a next month, a next year, or any combination thereof). The segment placement logic 108 may store the demand forecasts 218 in the demand database 211. The segment placement logic 108 may store a demand forecast for a particular segment based on a segment identifier 216 of the particular segment. For example, the segment placement logic 108 may receive demand information (e.g., the data 220) for a first segment (e.g., the first prefix segment 120A) and based on the demand information determine a demand forecast for the first segment (e.g., data 222). In a particular embodiment, the demand forecast for a segment may include a demand value for the segment (not shown). In a particular embodiment, the demand forecast 218 of Table 211A represents a most recent demand forecast for a segment.

In another particular embodiment, the demand forecast 218 of Table 211A may include multiple demand forecasts for the segment including a most recent demand forecast and one or more previous demand forecasts for the segment.

The placement database 212 is represented in FIG. 2 by a Table 212A. The Table 212A illustrates data that may be stored in the placement database 212. The Table 212A includes a segment identifier 213, assignment data 214, and cache data 215. The segment identifier 213 may operate similarly to the segment identifier 216 described with reference to the Table 211A.

The assignment data 214 may include information associated with a current assignment configuration for each of segment of each media content item of the content library 110. The assignment data 214 may identify distribution nodes to which each segment is assigned. For example, the assignment data 214 associated with the first suffix segment 120B may identify the VHO 160, indicating that the first suffix segment 120B is assigned to the storage partition 164 of the disk 162 at the VHO 160.

The cache data 215 may include information associated with a current cache configuration for each segment of the media content items of the content library 110. The cache data 215 may identify distribution nodes that include each segment in a cache partition of the distribution node. For example, the cache data 215 associated with the first prefix segment 120A may identify the VHO 130, indicating that the first prefix segment 120A has been stored in the cache partition 136 of the disk 132 at the VHO 130.

Thus, by storing demand information 217 and demand forecasts 218 in the demand database 211, the demand information 217 and demand forecasts 218 are accessible to the segment placement logic 108. Using demand information for a particular segment (e.g., data 248), the segment placement logic 108 is able to produce the demand forecast (e.g., data 250) for the particular segment (e.g., segment 126A). Based on the demand forecast 218 the segment placement logic 108 is able to determine a set of distribution nodes and assign the particular segment to the set of distribution nodes. Further, by storing the assignment data 214 and the cache data 215, the media content distribution system 200 is able to intelligently place assigned content. For example, after an assignment of a segment to a set of distribution nodes is determined, the segment placement logic 108 may access the assignment data 214 and the cache data 215 for the segment. If the assignment data 214 for the segment indicates that the segment is already stored at a particular distribution node in the set of distribution nodes, the segment will not be transmitted to that distribution node via the content distribution network 200. If the cache data 215 for the segment indicates that the segment is already stored at a particular distribution node in the cache partition of the disk at the particular distribution node, that particular distribution node may be instructed to copy the segment from the cache partition to the storage partition. Thus, the particular segment is not transmitted to the particular distribution node via the content distribution network 200. If the assignment data 214 and the cache data 215 indicate that the segment is not stored in the disk at the particular distribution node, the segment placement logic 108 may initiate a transfer of the segment to the particular distribution node via the content distribution network 200. The segment may be transferred to the particular distribution node from the SHO 102 or from another distribution node that has stored a copy of the segment on the disk at the other distribution node. Additionally, the segment may be transferred only in response to a user request for the segment. For example, rather than immediately transferring the segment to the particular distribution node, the segment placement logic 108 may instruct the particular distribution node to save the segment to the storage partition the next time the segment is received as a result of a cache miss at the particular distribution node.

FIGS. 3-14 depict various data representative of a media content distribution system according to various embodiments disclosed herein. In particular, FIGS. 3-14 were generated using data that was gathered over a 16 day period using a nationally deployed media distribution network. The nationally deployed media distribution network used to gather the data used to generate FIGS. 3-14 distributes video content; accordingly, the discussion of FIGS. 3-14 refers frequently to videos and video content (i.e., media content items discussed with reference to FIGS. 1 and 2). However, the disclosure is not limited exclusively to video content. Rather, embodiments disclosed herein may be applied to distribution of other media content, such as games, audio content, graphics, etc.

Figure 3:
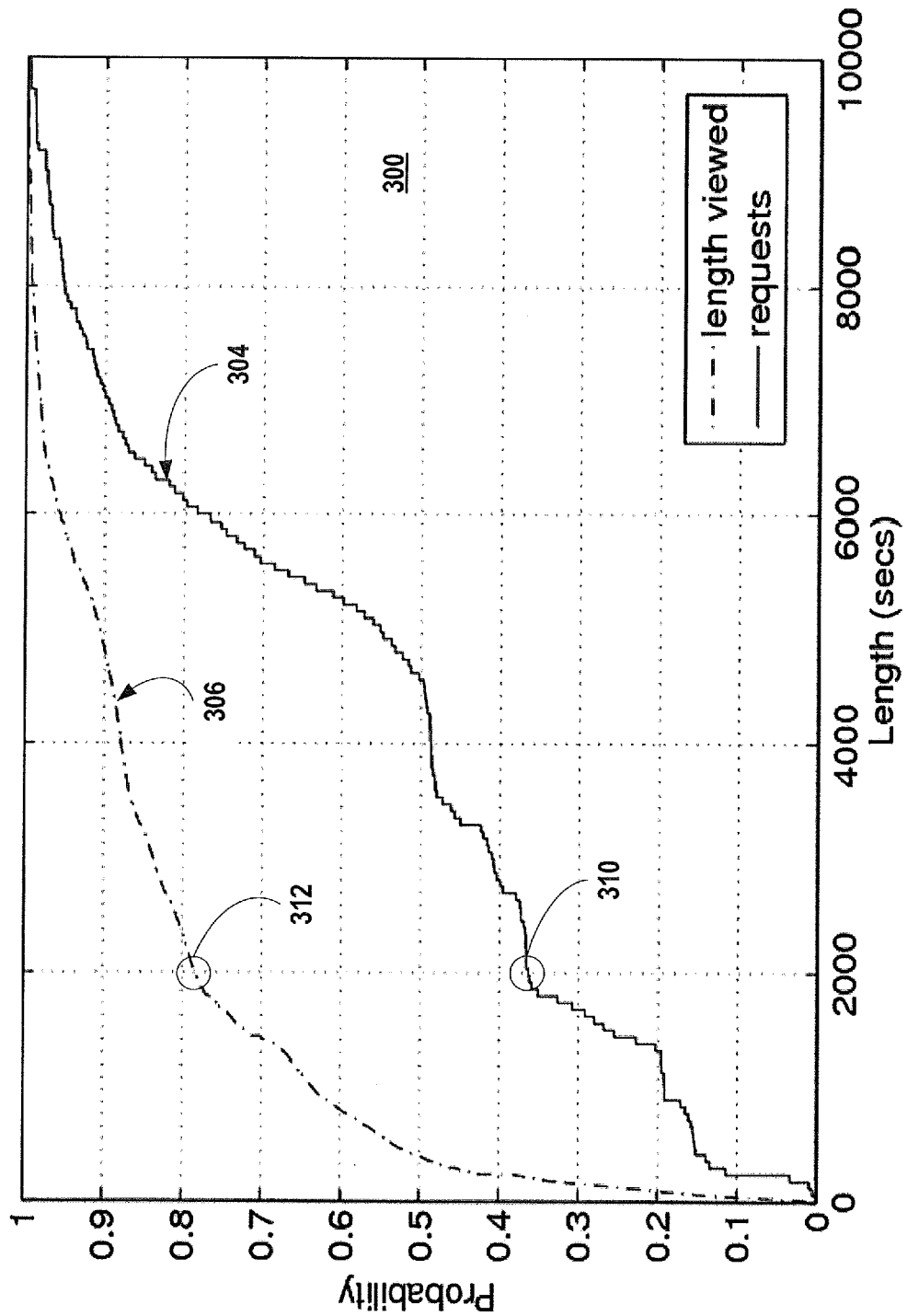
FIG. 3 is a graph illustrating a relationship between the length of requested videos and the normalized length viewed (NLV) for requested sessions.

FIG. 3 is a graphical illustration of a relationship between the length of requested videos and the normalized length viewed (NLV) for requested sessions and is generally designated 300. The NLV represents a length of a particular video that was watched as a fraction of a total length of the video. When a user accesses a video, the user may perform various functions that cause a session time (a time that a user device is receiving video data) to be different than a portion of the video viewed. The NLV is calculated based on the portion of the video viewed. For example, the user may spend 4 minutes fast forwarding to an 8th minute of video and may then watch another minute of the video before stopping the session. In this example, the session length is 5 minutes and the amount of the video viewed is 9 minutes. The NLV may be calculated as the amount of the video viewed divided by the length of the video. Thus, in the example above, if the length of the video is 30 minutes, the NLV may be 9 minutes divided by 30 minutes, or 0.3.

In FIG. 3, a plot of the cumulative distribution of the video length 304 and the viewed length 306 for a set of request sessions is shown. As shown in FIG. 3 at 310, about 36% of the requests are directed to videos that are approximately 2000 seconds (e.g., a 30 minute TV show) or less. As depicted in FIG. 3, the amount of video watched by users is much shorter. FIG. 3 shows at 312, that for almost 80% of the requests, the user watched 2000 seconds or less of the requested video.

Figure 4:
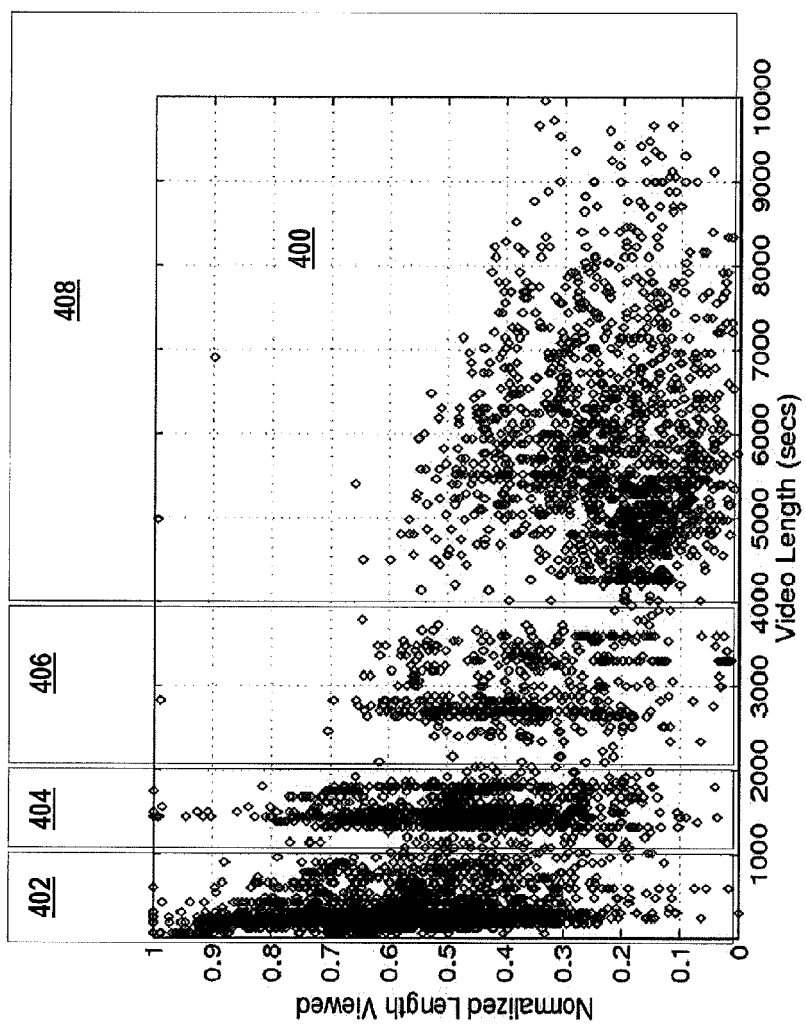
FIG. 4 is a graph illustrating of a correlation between a length of a requested video and a corresponding NLV.

FIG. 4 is a graphical illustration of a correlation between a length of a requested video and a corresponding NLV. FIG. 4 depicts a scatterplot 400 of the NLV for each requested video for videos of different lengths. The scatterplot 400 includes four clusters of video lengths designated 402, 404, 406, and 408. A first cluster 402 corresponds to videos that have a length between 0 seconds and approximately 1,000 seconds. A second cluster 404 corresponds to videos that are approximately 1,000 seconds to 2,000 seconds in length. A third cluster 406 corresponds to videos that are approximately 2,000 seconds to 4,000 seconds in length. A fourth cluster 408 corresponds to videos with lengths that are greater than approximately 4,000 seconds. The scatterplot 400 shows that shorter videos, such as the videos in the first cluster 402 and the second clusters 404 tend to have larger NLVs. Specifically, NLVs for videos shorter than approximately 1000 seconds are mostly in the range of (0.2-0.9) as shown by the first cluster 402, while NLVs for videos longer than approximately 4000 seconds are typically less than 0.5 as shown by the fourth cluster 408.

Figure 5:
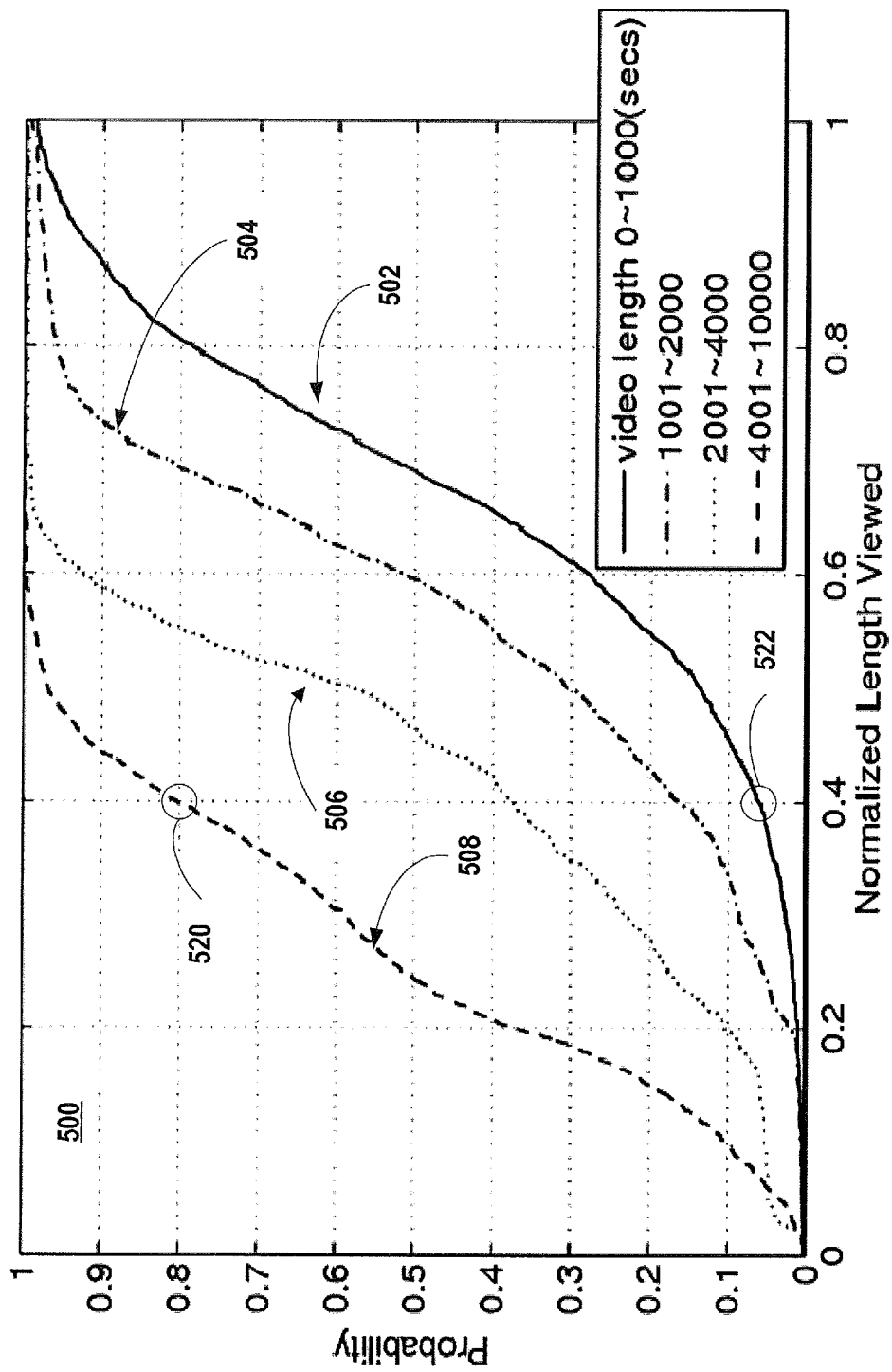
FIG. 5 is a graph of cumulative distribution of the normalized length viewed for different classes of video lengths.

FIG. 5 is a graph 500 illustrating cumulative distributions of the four clusters 402-408 of FIG. 4. The graph 500 includes a first distribution 502, a second distribution 504, a third distribution 506, and a fourth distribution 508. The first distribution 502 corresponds to videos that are between 0 seconds and approximately 1,000 seconds in length (i.e., the first cluster 402 of FIG. 4). The second distribution 504 corresponds to videos that are approximately 1,000 seconds to 2,000 seconds in length (i.e., the second cluster 404 of FIG. 4). The third distribution 506 corresponds to videos that are approximately 2,000 seconds to 4,000 seconds in length (i.e., the third cluster 406 of FIG. 4). The fourth distribution 508 corresponds to videos with lengths that are greater than approximately 4,000 seconds (i.e., the fourth cluster 408 of FIG. 4). The graph 500 shows that longer videos, such as videos in the third distribution 506 and the fourth distribution 508, tend to have smaller NLV values. The graph 500 also shows, at 520, that for videos of the greatest length, around 80% of the requests stopped before viewing 40% of the video length. The graph 500 also shows, at 522, that only about 5% of the requests for videos with the shortest length stopped viewing before 40% of the video had been viewed, at 522.

Figure 6:
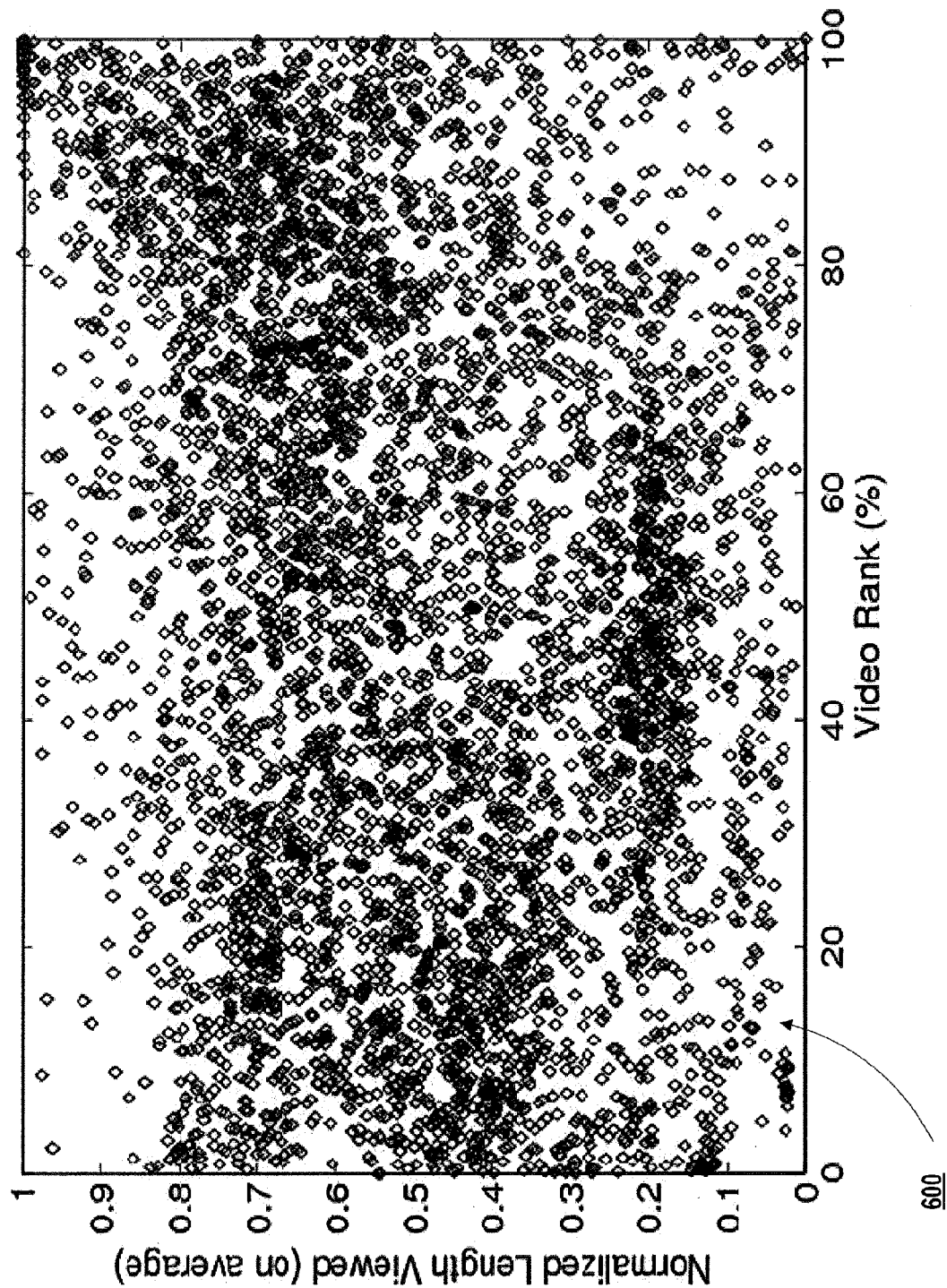
FIG. 6 is a graph illustrating a relationship between popularity of a video and how much of the video is viewed.

FIG. 6 is a graph 600 illustrating a relationship between popularity of a video and how much of the video is viewed. The graph 600 shows that there is little correlation between the popularity of the video and how much of the video is actually viewed.

Figure 7:
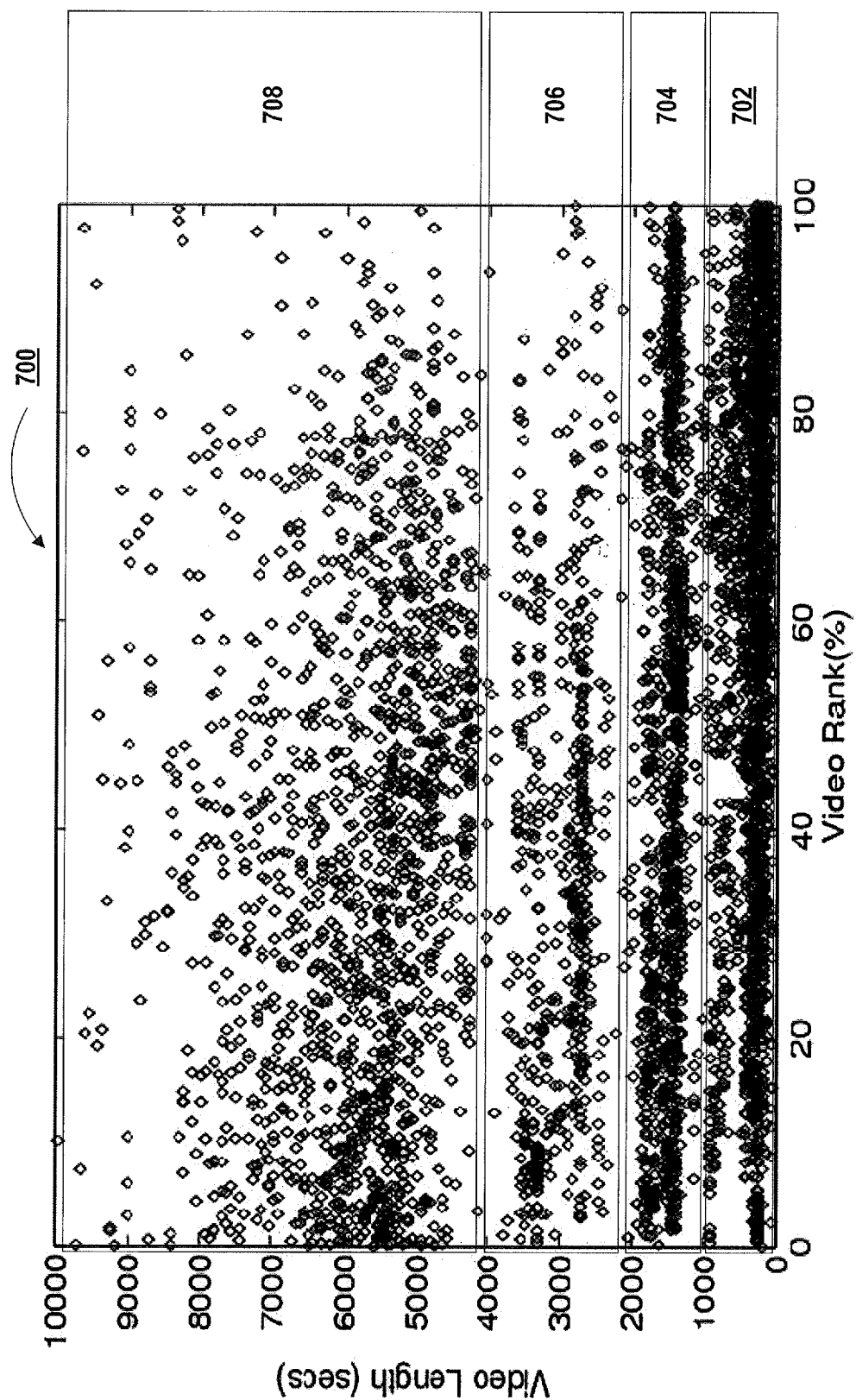
FIG. 7 is a graph of video length for videos of decreasing popularity in a particular distribution network.

FIG. 7 is a graph 700 of video lengths for videos of decreasing popularity. As in FIG. 4, four clusters of videos are shown. The graph 700 includes a first cluster 702, a second cluster 704, a third cluster 706, and a fourth cluster 708. The first cluster 702 corresponds to videos that are between 0 seconds and approximately 1,000 seconds in length (i.e., the first cluster 402 of FIG. 4). The second cluster 704 corresponds to videos that are approximately 1,000 seconds to 2,000 seconds in length (i.e., the second cluster 404 of FIG. 4). The third cluster 706 corresponds to videos that are approximately 2,000 seconds to 4,000 seconds in length (i.e., the third cluster 406 of FIG. 4). The fourth cluster 708 corresponds to videos with lengths that are greater than approximately 4,000 seconds (i.e., the fourth cluster 408 of FIG. 4). As can be seen in the graph 700, within a given cluster, there are some indications of bias in popularity (as measured by rank of the video within a video library). For example, the first cluster 702 and the second cluster 704 seem to indicate that shorter videos are denser in the unpopular zone, while the third cluster 706 and the fourth cluster 708 seem to indicate that the density is higher for longer videos in the popular zone. However, the graph 700 does not appear to show a strong bias in popularity across the clusters 702-708. Although not shown in the graph 700, there does not appear to be a strong correlation between popularity and NLV. Therefore, determining how to place video content based solely on the popularity of a video may lead to an inaccurate placement decision.

Figure 8:
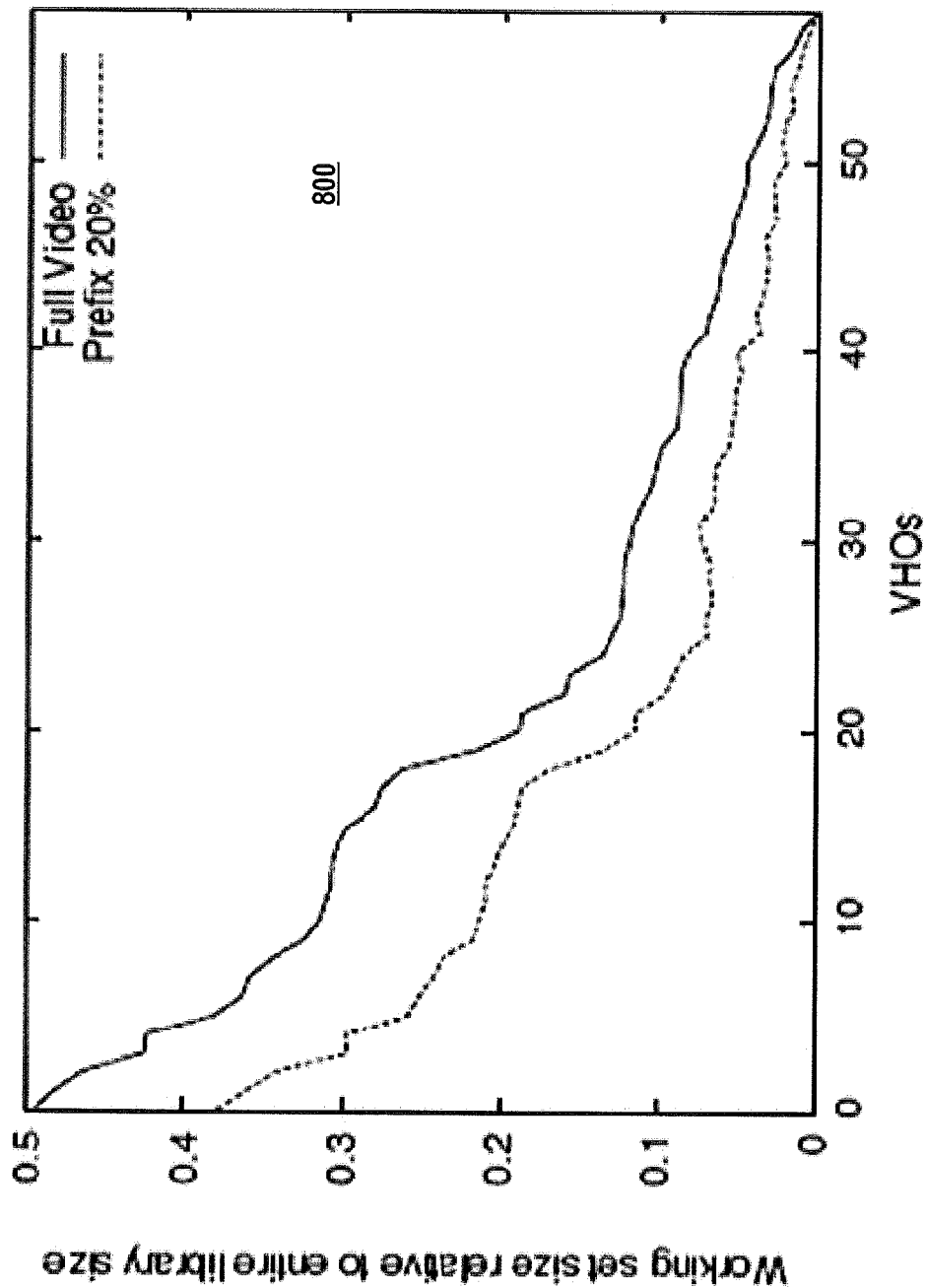
FIG. 8 is a graph of a working set size relative to a video library at multiple distribution nodes.

A working set of videos at a particular distribution node of a distribution network (e.g., a VHO location of the distribution network) refers to a number of unique videos that are requested within a time window. The working set may determine how effective caching is going to be. If a cache size at a particular distribution node is smaller than the working set, there will be a large number of cache evictions. Referring to FIG. 8, a graph 800 of a working set size relative to an entire video library at multiple distribution nodes (e.g., VHOs) is shown. The graph 800 shows that the working set size at a particular distribution node can be as high as 50% of the entire video library size. The graph 800 shows, at 804, that a top 20 VHOs (e.g., distribution nodes) have a working set of 20% of the library size or more. The graph 800 shows that when prefixes (with a prefix size of 20% of the size of the video) are used for content placement, the working set size can be as large as 38% of the library size while the top 18 VHOs have a working set size of 20% of the library size or more. The graph 800 may indicate that storage space at each VHO has to be quite large for caching strategies to be successful.

In a particular embodiment, a mixed integer program (MIP) is used to determine content placement at particular distribution nodes within a video distribution network. The MIP may be formulated as described below.

Let V denote a set of VHO locations, L the set of directed links between these locations, and W the set of videos in a video content catalog. To consider multiple segments of a single video (e.g., prefix, suffix), M is used to denote the set of distinct segments of the single video. Thus, M is equal to W when videos are not broken into multiple segments. The MIP may account for link bandwidth constraints during a set of time slices, T. The time slices T may be identified to be 1-hour windows during a peak busy period on weekend days. Each VHO i may have a disk D with a capacity $D_i$, and a size of m∈M is $s^m$. Video segments may be of any size. For each pair of VHOs j∈V, there is a fixed directed path $P_{ij}$ from i to j, where $P_{ii} = \emptyset$. The capacity of a link l∈L is $B_l$, while the bit rate of a video m∈M is $r^m$ (both in Mbps). For each video m∈M, VHO j∈V receives $a_j^m$ requests during an entire modeling period. Using detailed stream control traces (including, for example, fast forward and rewind information, not just distinct movie requests by the user) of user interactions, a length of the video that a particular user views can be determined, and thereby derive the counts for each segment of the video (i.e., a prefix segment, suffix segment, or other more elaborate definition of segment) requested. At any given time slice t∈T, the number of concurrent streams is $f_j^m(t)$. A cost of serving one gigabyte (GB) of video from i to j may be denoted as $c_{ij}$. This cost for a remote service may be proportional to the number of hops between i and j (i.e., $|P_{ij}|$).

The MIP model may include two types of decision variables. For each i∈V and each m∈M, a binary variable may indicate whether to store m at i. When a request for m arrives at a VHO j, the variable $x_{ij}^m$ identifies what fraction of requests should be served from VHO I, where $x_{jj}^m = 1$ means that j handles the requests locally.

The content placement problem may be solved to reduce the cost of the total bytes transferred, subject to the disk space and link bandwidth limits. For example, the content placement may be optimized by minimizing the cost of the total bytes transferred, subject to the disk space and link bandwidth limits. The content placement problem can be formulated as a MIP with the following objective function (1) and constraints (2 through 7):

$$\min \sum_{m \in M, j \in V} \sum s^m a_j^m c_{ij} x_{ij}^m \quad (1)$$

$$s.t. \sum_{i \in V} x_{ij}^m = 1, \forall m \in M, j \in V \quad (2)$$

$$x_{ij}^m \leq y_i^m, \forall i, j \in V, m \in M \quad (3)$$

$$\sum_{m \in M} s^m y_i^m \leq D_i, \forall i \in V \quad (4)$$

$$\sum_{m \in M} \sum_{i, j \in V: l \in P_{ij}} r^m f_j^m(t) x_{ij}^m \leq B_l, \forall l \in L, t \in T \quad (5)$$

$$x_{ij}^m \geq 0, \forall i, j \in V, m \in M \quad (6)$$

$$y_i^m \in \{0, 1\}, \forall i \in V, m \in M \quad (7)$$

Objective function (1) indicates that an overall cost of serving all requests for an entire period is to be minimized. Constraint (2) indicates that all of the requests should be successfully served (either locally or remotely). Constraint (3) indicates that a location i can serve particular content m only when the location i has a local copy of the particular content m. Constraints (4) and (5) indicate that disk capacity and link bandwidth capacity are constrained. Constraint (7) indicates that a given segment of a movie (i.e., either a prefix segment or a suffix segment) is always stored in its entirety at a particular location or is not stored at the particular location. Constraints (2) and (3) combine to cause all of the segments of each video in the video library to be available in the system (across the entire set of VHOs V (i.e., $$\sum_{i \in V} y_i^m \geq 1, \forall m \in M \Big)\Big).$$

In a particular embodiment, the above described constraints can be considered and accounted for concurrently to determine placement of media content items.

In a particular embodiment, the MIP may generate a fractional solution related to placement of a particular content item. Thus, a rounding scheme may be applied. For example, a rounding approach based on a potential function method may be used.

When determining placement, only the history for each segment that has been accessed until that time is known. Further, content may be continually or frequently added to the library (e.g., new videos, TV shows, and movies may be added on a daily basis). Thus, estimating potential demand for new videos (i.e., new segments) in the library may be challenging. One approach to estimating demand for new videos is to use a simple strategy where the demand for TV shows is estimated based on the historical access pattern for previous episodes of the same TV show. This strategy can also be used to estimate the demand for popular "blockbuster" movies, which are identified based on external side-information. The demand for a movie may be estimated using a demand history of top movie during a previous time period (e.g., a previous week). This approach may be extended to estimate the demand for multiple segments of a video (e.g., a prefix segment and a suffix segment). For a new video $w_1 \in W$, first identify a segment $w_2 \in W$ to use for estimation. Then use a demand for the segment $w_2$ during the previous time period as the demand estimate for the segment w1. In a particular embodiment, $w_1$ and $w_2$ correspond to prefix segments. In another particular embodiment, $w_1$ and $w_2$ correspond to suffix segments. The terms "prefix" and "suffix" are used herein merely as a convenient way of distinguishing segments. While the terms "prefix" and "suffix" are used to refer to segments throughout this description, a particular video may be split into more than two segments. Further, the segments into which a video is split may not correspond to a preceding portion of the video and a subsequent portion of the video, as the terms "prefix" and "suffix" may imply. Rather, each segment may be taken from any portion of the video (e.g., a beginning, a middle, or an end) and the "prefix" segment may precede or follow or be a subset of the "suffix" segment (and one or more other segments) of the video. Similarly, the "suffix" segment may precede or follow or be a subset of the "prefix" segment (and one or more other segments) of the video.

A small cache may be employed at a particular distribution node. The cache may be complementary to the storage used for pre-populated segments (i.e., segments assigned to the particular distribution node using a content placement scheme as disclosed herein). The cache may make the content distribution system robust when handling estimation inaccuracies, new videos that do not have a previous demand estimation (e.g., new music videos, non-blockbuster movies, etc.), and flash crowds for some videos.

Finding an optimal solution to the above MIP is NP-hard. One approach that may be used to solve the MIP is to first solve a linear programming problem (LP) obtained by relaxing integral constraint (7) to be just $y_i^m \geq 0$ and then apply a rounding heuristic to obtain an integer solution. Although LPs can be solved in polynomial time, the systems and problem scope contemplated by the present disclosure involve instances that are so large that a state-of-the-art commercial LP solver may have difficulty efficiently solving even the LP relaxation. To overcome this challenge, an approach based on a potential function method may be used. The basic idea of this approach is to use a Lagrangian relaxation to remove the disk space constraint (4) and the link bandwidth constraints (5), which decomposes the optimization problem into small independent (i.e., fractional) uncapacitated facility location subproblems (one for each video segment). Gradient descent-based iterations are performed as a column selection strategy to identify a subset of variables with non-negligible values. Then, by constructing a restricted LP using only those variables (which may be much smaller than the full LP), a feasible upper bound and a good lower bound may be obtained using the optimal dual variables. This enables a solution to the original LP that strictly satisfies all of the constraints and achieves an objective value that is provably within 1% of optimal.

Based on the fractional solution, the fractional $y_i^m$ are rounded to integer values by sequentially solving a small MIP for each movie m, which minimizes the cumulative increase (over the movies or segments processed so far) in the disk (4), link bandwidth (5), and objective (1) constraints, while enforcing the service constraints (2) and (3) and variable bounds (6) and (7). Experiments have shown that the final integer solution typically leads to around 1-2% overage for disk, link bandwidth, and the objective function (1), which is the cost to serve all the requests, when compared to the fractional solution.

The above formulation treats multiple segments of a single video independently. In a particular embodiment, it may be desirable to account for dependency between the access of the suffix segment of a video w∈W and the prefix segment of w. For example, this may help for non-performance reasons (e.g., management of licenses) or other considerations not captured by the optimization formulation. Specifically, if a copy of the suffix segment of video w is placed at a VHO that has a copy of the corresponding prefix, the above formulation may include the following constraint:

$$y_i^\beta \leq y_i^\alpha, \forall i \in V, \omega \in W \quad (8)$$

where β=suffix (w) and α=prefix (w). This constraint can be generalized for scenarios where a video is broken into more than two segments (i.e., a prefix segment and two or more suffix segments). For example, if the prefix segment of the video w is placed at each of VHO 130, VHO 150, and VHO 160 of the media content distribution system 100 of FIG. 1, then the suffix segment of the video w should be placed within at least one of VHO 130, VHO 150, and VHO 160. Additionally, a second suffix segment of the video w should also be placed within at least one of VHO 130, VHO 150, and VHO 160. Thus, in a particular embodiment each suffix segment of the video w is placed at a particular VHO where a copy of the prefix segment of the video w has been placed. Much of the remainder of this disclosure focuses on the basic formulation where all segments of the video are treated individually (i.e., independently of other segments of the video).

The use of Lagrangian relaxation decomposes the optimization problem into small independent subproblems (one for each video), which can be solved efficiently. After every fixed number of gradient descent-based iterations, a subset of variables with non-negligible values in the overall solution may be identified. Then, a feasible fractional solution is found from a restricted version of the original LP including only of the identified subset of variables, which is typically much smaller than the full LP.

The Lagrangian relaxation may overlook the disk space and link bandwidth constraints (e.g., constraints (4) and (5)). These terms may be incorporated into the objective function using Lagrangian multipliers that are used to define a potential function that is minimized using gradient descent. The use of Lagrangian relaxation decomposes the problem into a number of independent (fractional) uncapacitated facility location problems, one for each video segment. Solutions may be iteratively found for the independent problems and the overall solution may be updated based on the solutions. Lagrangian multipliers using a line search may be used to improve the potential function. In a particular embodiment, a subset of variables may be identified after a fixed number of iterations. Then, a feasible fractional solution may be found from a restricted version of the original LP including only of those variables, which is typically much smaller than the full LP.

Based on the fractional solution, the fractional $y_i^m$ be rounded to integer values by sequentially solving a MIP for each movie m, processed in order of decreasing total demand. If all of the $y_i^m$ for movie m are already integer, the $y_i^m$ and $x_{ij}^m$ are unchanged. Otherwise they are replaced with the solution to the MIP which minimizes the cumulative increase (over the movies processed so far) in the disk (constraint 4), link bandwidth (constraint 5), and objective (constrain 1), while enforcing the service constraints (2) and (3) and variable bounds (6) and (7). Since the impact of rounding $y_i^m$ on the disk constraint (4) depends significantly on the video size $s^m$, separate cumulative increases are maintained for each value of $s^m$. The final integer solution typically leads to around 1-2% overage for disk, link bandwidth, and the objective function, when compared to the fractional solution.

The formulations discussed above were evaluated for performance using various simulations that were compared with other content placement approaches. Simulations were run using a custom event-driven simulator to implement the network between the VHOs (distribution nodes) and to perform trace-driven simulations. The simulator assumed that each VHO had a certain amount of disk space that was partitioned into two parts. One part stored the videos assigned to the VHO (i.e., videos assign via a content placement scheme that are not eligible for replacement), and the other part is used as a dynamic cache (e.g., a least recently used (LRU) cache). Upon a user request, if a requested video is available locally (either in the pre-assigned portion or the dynamic cache portion), the VHO simply handles the transfer locally without consuming network bandwidth. If the requested video is not available locally, the VHO fetches the video from a remote VHO that stores the requested video. The simulator assumed the existence of a directory that keeps track of which videos (and video segments) are stored in each VHO. In the case of strategies using a dynamic cache, the set of video segments stored at a VHO may change over time. The simulator assumed a perfect directory that always finds the closest VHO with a local copy. Note that this is the best case scenario for content distribution systems implementing dynamic cache strategies. For the MIP-based strategy, the MIP solution guides from which VHO to fetch the video (i.e., x variables in the formulation).

A network modeled from a nationally deployed content distribution network was used to conduct experiments based on the MIP formulation discussed above. The modeled network included 59 nodes (i.e., VHOs) with over 70 bi-directional links of equal bandwidth connecting the different VHOs. The modeled network also includes equal disk sizes at each VHO. During the simulation, the bandwidth of the links and the disk size were varied to understand the trade-offs between disk capacity and bandwidth. Note that to protect proprietary information, the actual disk size values are not specified herein. Instead, normalized disk sizes are used, where the disk size is normalized relative to space needed to store the entire video library. To simulate video requests by users, the trace data described above was used. The trace data includes information about the stream control operations performed by users. In the simulation, these stream control operations were translated to the portion of the video requested (e.g., a prefix segment or a suffix segment). Note that if a request from a user resulted in transferring data from a remote location, the transfer was not stopped prematurely even if the user did so. This allows caching of the entire video segment so that the video segment may be served locally when it is requested again (if the video segment is still in the cache). All videos were assumed to use a streaming rate of 2 Mbps (storing one second of video uses about 256 KB of disk).

The prefix-based MIP placement approach (MIP-p) is compared with LRU-based prefix caching (abbreviated LRU-p). Cases using full videos for LRU (abbreviated LRU-f) and MIP-based placement of full videos (abbreviated MIP-f) were also compared. In each of the caching approaches, one copy of every video was placed at a random location and the dynamics of the requests were allowed to cache a copy at different VHOs. In all of the experiments, the primary interest is the amount of data stored and transferred among the VHOs. The first 9 days of data (of the 16 days of data gathered, as described above) were used to compute the placement for the last 7 days for the MIP-f approach and the MIP-p approach. For the case of the LRU-f approach and the LRU-p approach, the first 9 days of data were used to "warm up" the caches (i.e., generate local copies of videos within the caches).

Figure 9:
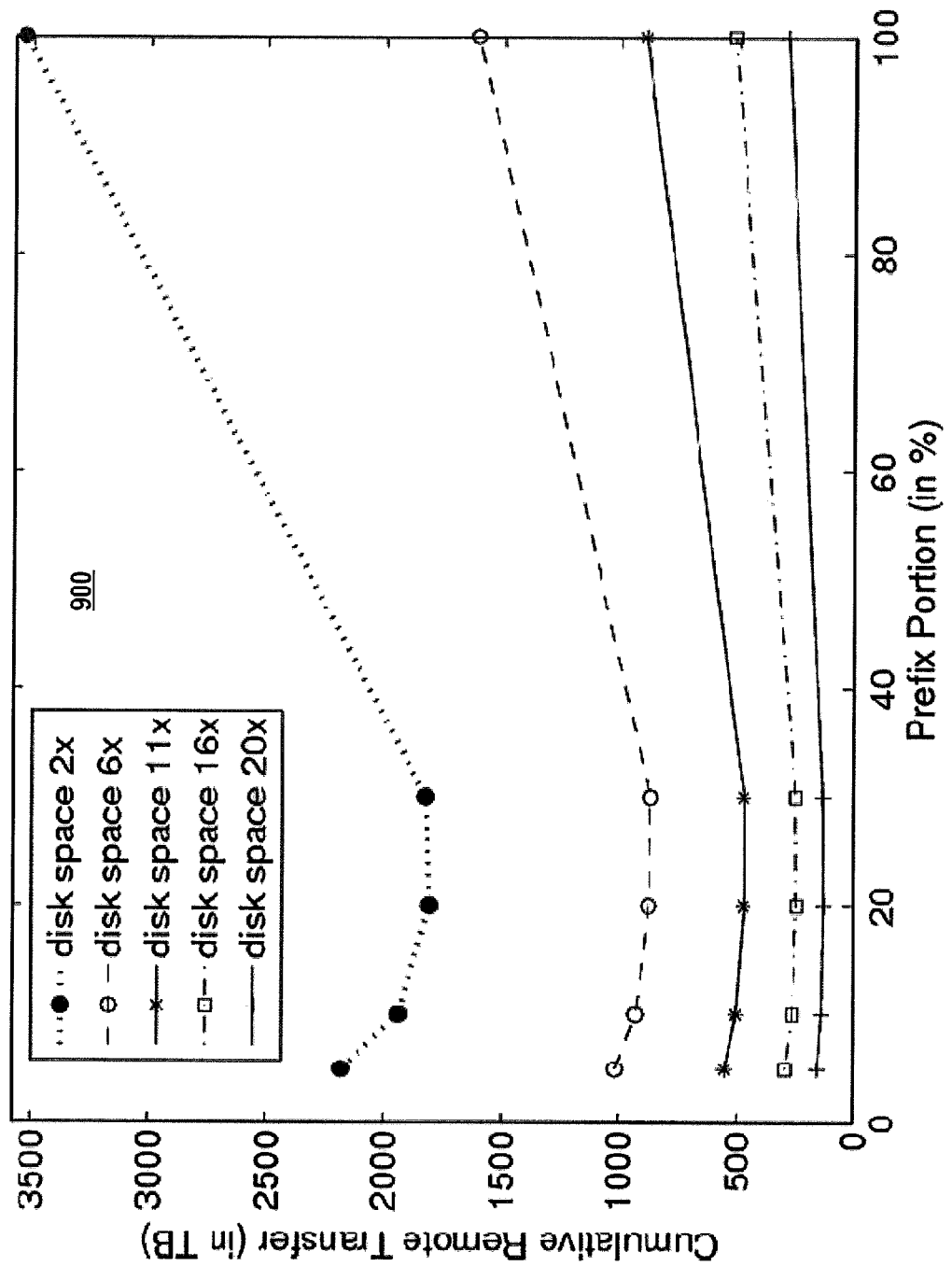
FIG. 9 is a graph of total bytes transferred when segment lengths of content items are varied.

The prefix segment length of a video may determine how many requests for the video the prefix can satisfy without retrieving the corresponding suffix segment. If the length of the prefix segment is too short, many of the requests will require transferring the suffix segment. However, if the prefix segment is too long, the system will not fully exploit the savings from taking advantage of user behavior. FIG. 9 may provide some guideline as to determining a size of the prefix segment. Simulations were performed to choose a prefix value for the rest of the simulations. An initial fraction (e.g., 20%) of each video was used as the prefix segment length and this fraction was varied. However, if the length of a video was very short (e.g., less than 10 minutes), the full video was stored or fetched as a single segment. The experiments measure how LRU performs when the prefix segment size changes. The motivation is to use a prefix segment size that gives maximum benefit to caching-based approaches. The results are plotted in graph 900 of FIG. 9.

FIG. 9 is a graph 900 of total bytes transferred when segment lengths are varied. Note a prefix size of 100% corresponds to a full video. The graph 900 indicates that the total bytes transferred goes down when prefix segments are used. Also, the total bytes transferred decreases as disk size increases. More interestingly, the total bytes transferred consistently decreases as the prefix segment size increases from about 5% to about 20%. However, once the prefix segment size increases beyond about 30%, the total bytes transferred starts to increase. The graph 900 indicates that using about 20% of each video as a prefix seems to result in a smallest number of total bytes transferred in each case. Thus, for the remainder of this disclosure, a prefix size of 20% of the video is assumed. However, the prefix size that is selected may vary based on many factors, such as details of the content distribution network (e.g., number of nodes, number and bandwidth of links), user demand (e.g., behavior of a particular set of users and whether they resume watching a particular video after some time), type of content, and other factors. Accordingly, the disclosure is not limited to using a prefix size of 20%. Rather, the disclosure provides insights into a manner of selecting an appropriate prefix size and merely uses a 20% prefix size as one example of an appropriate prefix size for a given data set and content distribution network.

The performance of the different approaches in terms of the bandwidth used for a given amount of disk space was compared. Disk space was allocated at each VHO such that the total space across all the VHOs was 2× the space needed to store the entire video library. As a result, each VHO had space equaling about 3% of the total video library space (i.e., 200% divided by 59 distribution nodes=~3%). In the case of MIP-f and MIP-p, the 3% included a small complementary cache (around 5% of the space at each VHO) to accommodate for errors in demand estimation and to handle flash crowds. The LRU-f and LRU-p methods resulted in around 50% of the space at each VHO being reserved for the LRU cache.

Figure 10:
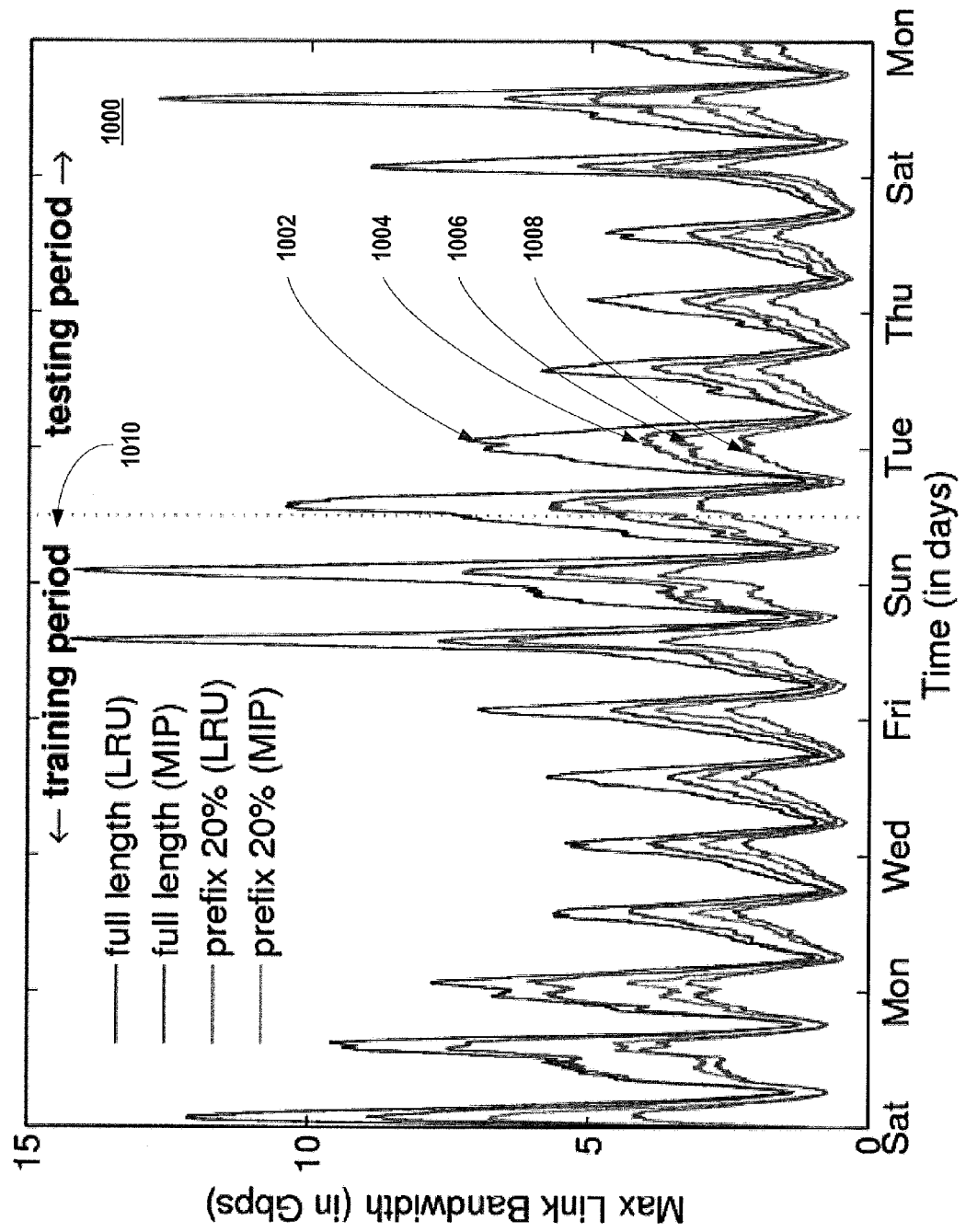
FIG. 10 is a graph of the link bandwidth utilized in a particular distribution network by day.

Referring to FIG. 10, a graph 1000 of link bandwidth utilization by day is shown. The graph 1000 shows simulation data for 4 media content distribution systems. The media content distribution systems place media content items within the media content distribution systems using one of an LRU-f approach (represented by a first line 1002), an MIP-f approach (represented by a second line 1004), an LRU-p 1006 approach (represented by a third line 1006), and an MIP-p approach (represented by a fourth line 1008). The LRU-f approach placed complete copies of each video w∈W at each VHO. The LRU-p approach placed prefix segments of each video w∈W at each VHO. The MIP-f approach placed complete copies of each video w∈W at particular VHOs as designated by the MIP. The MIP-p approach placed prefix segments of each video w∈W at particular VHOs as designated by the MIP.

A training period 1010 was used to place content using the MIP-f and MIP-p approaches. The training period 1010 was used to generate demand information related to videos to be placed. The training period may be associated with a previous week and content may be placed within the media content distribution system based on demand information collected during the training period. The graph 1000 indicates that the MIP-f and the MIP-p approaches outperformed the LRU-f and LRU-p approaches. For example, a peak bandwidth needed in the last seven days goes down from about 12.5 Gbps in the LRU-f approach (line 1002) to about 6 Gbps using the MIP-f approach (line 1004). Thus, decreases in the bandwidth consumed by a media content distribution system may be realized by accounting for user behavior when placing media content items in a media content distribution system, such as the media content distribution systems 100, 200.

By storing and fetching prefix segments and suffix segments, a peak bandwidth for the LRU-p approach (line 1006) may be decreased to about 5 Gbps. By storing and fetching prefix segments and suffix segments based on the MIP formulation for the MIP-p approach (line 1008), the peak bandwidth may decrease to about 2.5 Gbps. The graph 1000 indicates that the MIP-p approach consistently achieves lower bandwidth consumption than each of the other placement approaches. Thus, a media content distribution system implemented using the MIP-p approach described herein may result in significant savings to a service provider that provides media content via the media content distribution system. For example, the service provider would need 10 Gigabit-Ethernet links in the backbone of a media content distribution system implemented using the LRU-f approach, while OC-48 links (about 3 times less expensive in a present market) may be used in a media content distribution system using the MIP-p approach.

Figure 11:
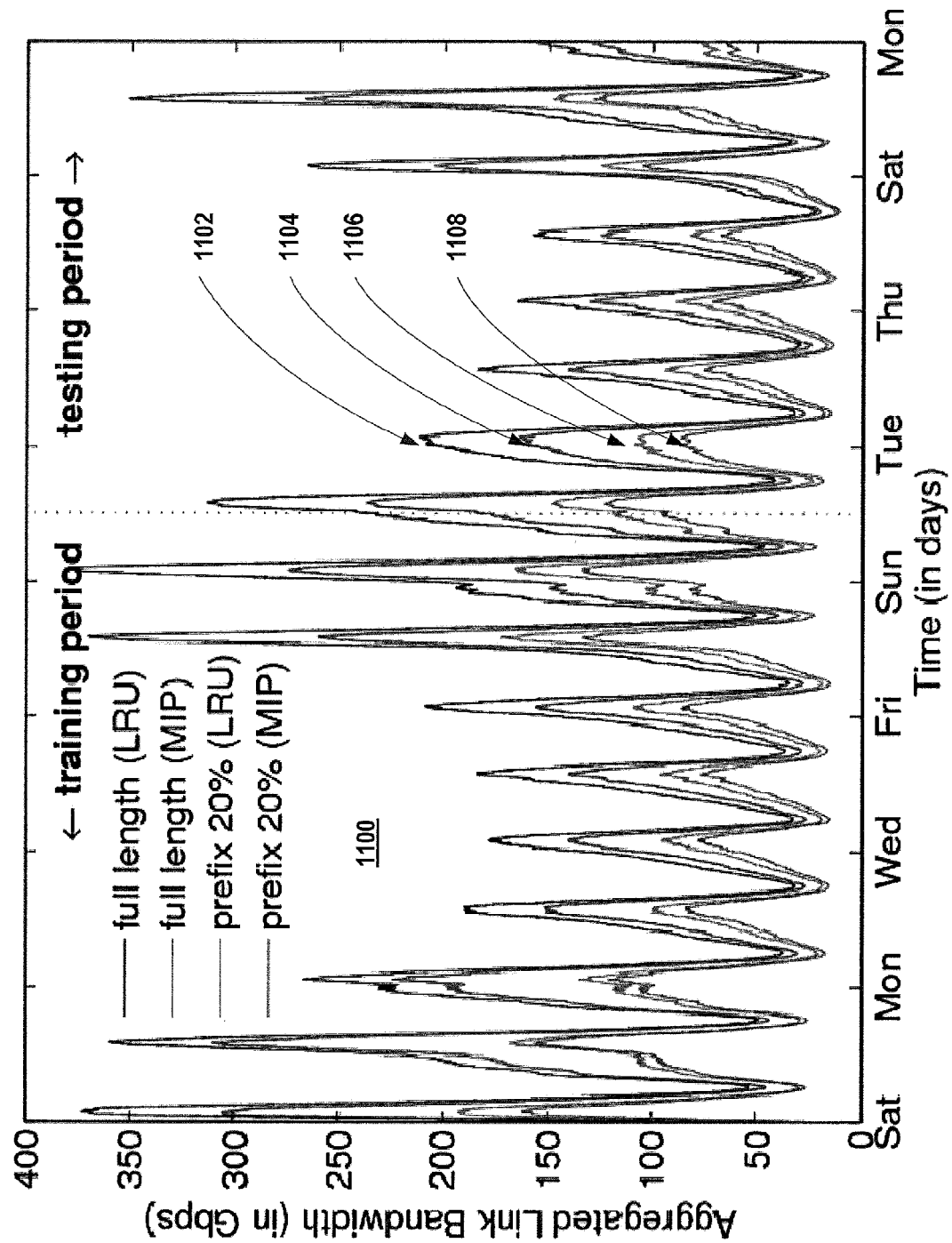
FIG. 11 is a graph of the aggregate link bandwidth utilized in a particular distribution network by day.

Referring to FIG. 11, a graph 1100 of aggregate link bandwidth utilization by day is shown. As described above with respect to FIG. 10, FIG. 11 includes simulation data for 4 media content distribution systems. The media content distribution systems place media content items within the media content distribution systems using one of an LRU-f approach (represented by a first line 1102), an MIP-f approach (represented by a second line 1104), an LRU-p approach (represented by a third line 1106), and an MIP-p 1108 approach (represented by a fourth line 1108). The LRU-f approach placed complete copies of each video w∈W at each VHO. The LRU-p approach placed prefix segments of each video w∈W at each VHO. The MIP-f approach placed complete copies of each video w∈W at particular VHOs as designated by the MIP. The MIP-p approach placed prefix segments of each video w∈W at particular VHOs as designated by the MIP. The graph 1100 indicates that a media content distribution system that uses the MIP-p approach to place segments within the media content distribution system resulted in a least amount of data transferred. For example, in a worst case, the media content distribution system that used the LRU-f approach to place media content items within the media content distribution system resulted in about 350 Gbps of data transferred over the network while the media content distribution system using the MIP-p approach resulted in about 130 Gbps of data transferred over the network. Thus, the media content distribution system that used the MIP-p approach to place segments within the media content distribution system resulted in approximately a 65% reduction in network traffic.

A feasibility region for each of the different approaches was also studied. A feasibility region refers to a combination of a minimum amount of disk and bandwidth needed for the solution to be practical. To study the feasibility region, simulations were performed in which a total amount of disk space in the content distribution system was varied from 2× the library size to 20× the library size and a minimum amount of bandwidth needed for each amount of disk space was measured.

Figure 12:
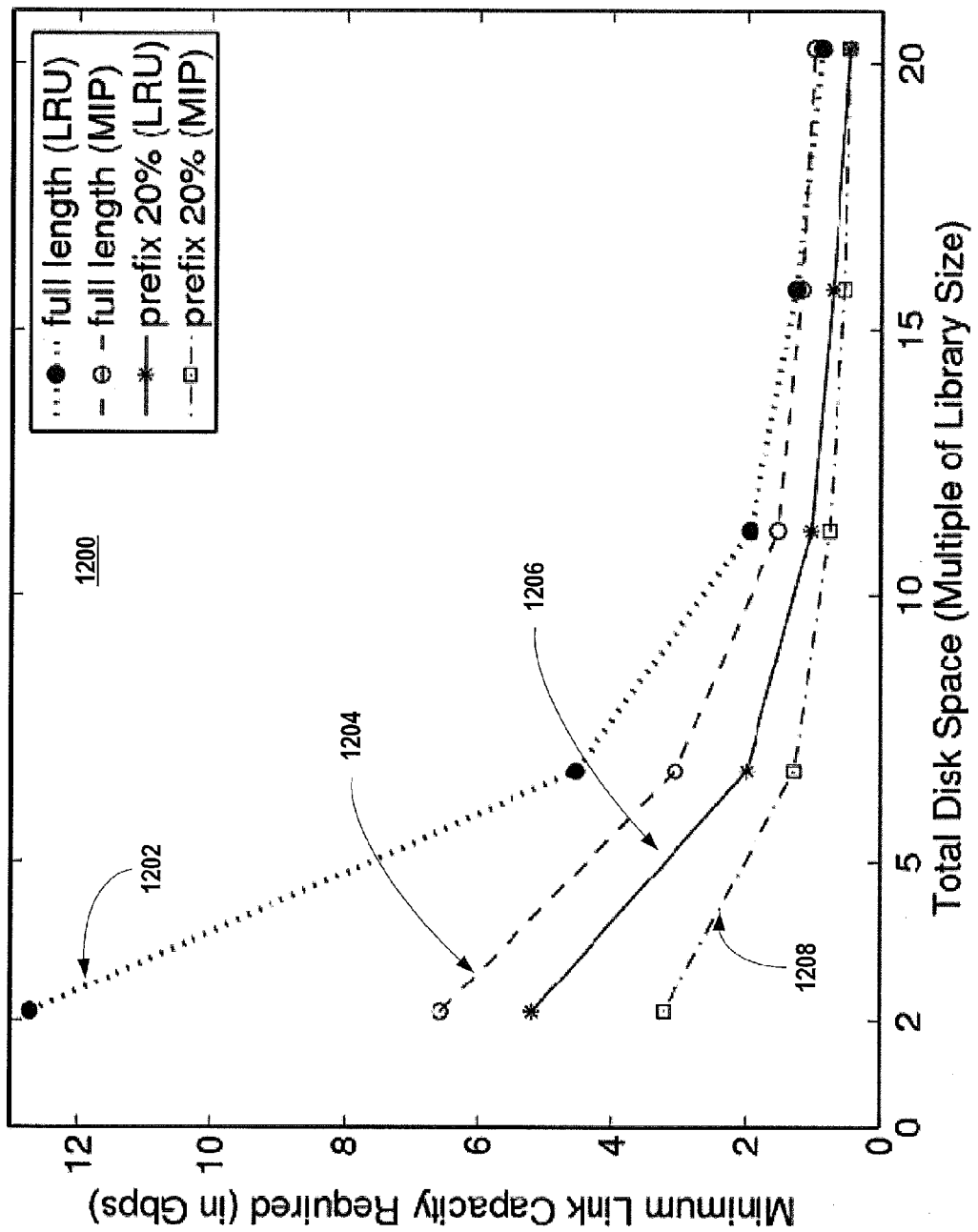
FIG. 12 is a graph of link bandwidth capacity requirements for various disk capacities in a particular distribution network.

Referring to FIG. 12, a graph 1200 of link bandwidth capacity requirements for various disk capacities is shown. The graph 1200 indicates that the amount of bandwidth required decreases as the amount of disk space increases in the system. More interestingly, prefix based approaches (such as a MIP-p approach represented by a first line 1208 and an LRU-p approach represented by a second line 1206) that take user behavior into account consistently require less bandwidth than approaches that deal with full videos (i.e., the MIP-f approach represented by a third line 1204 and LRU-f approach represented by a fourth line 1202). This was true even when the disk space in the system was 20× the library size, in which case each VHO had enough space to store around one third of the entire library. The graph 1200 also shows that placement-based solutions outperform caching-based solutions when the disk space was scarce (e.g., about 2× to about 6×). When the disk space was 16× or higher, there was little distinction between the corresponding placement and caching approaches. This may indicate that caching solutions should have space corresponding to a "working set size". The graph 1200 also shows that there were diminishing returns as the amount of disk space increased from about 11× to 20×, especially for the MIP-f and MIP-p approaches.

Figure 13A:
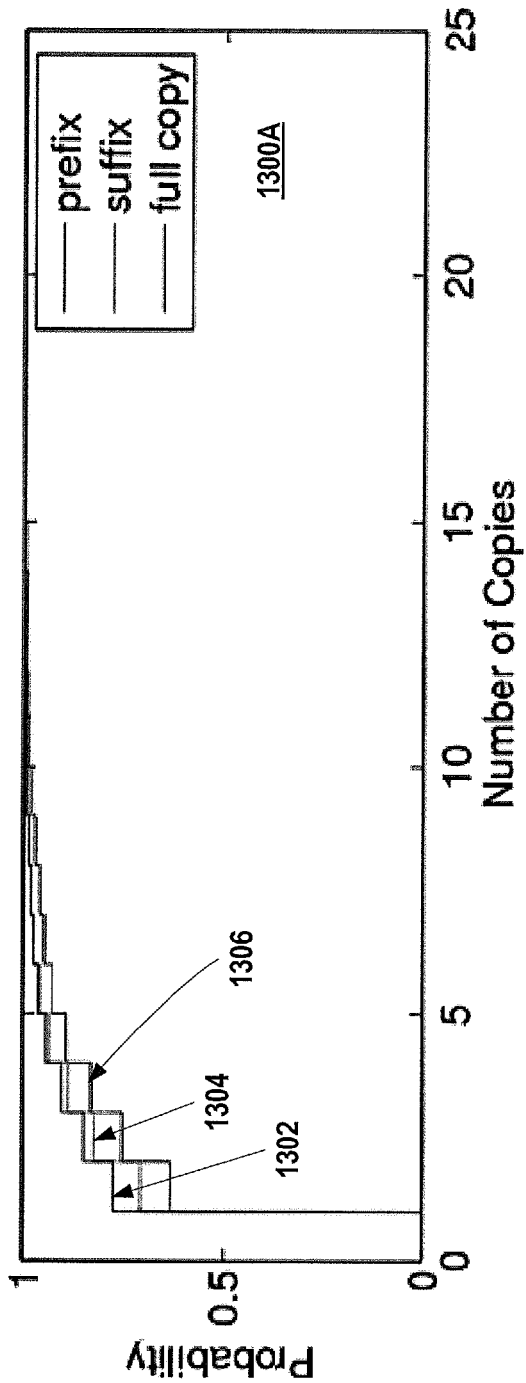
FIGS. 13A and 13B are graphs of the cumulative distribution of a number of replicas created when content is placed using an MIP-based approach according to a particular embodiment.
Figure 13B:
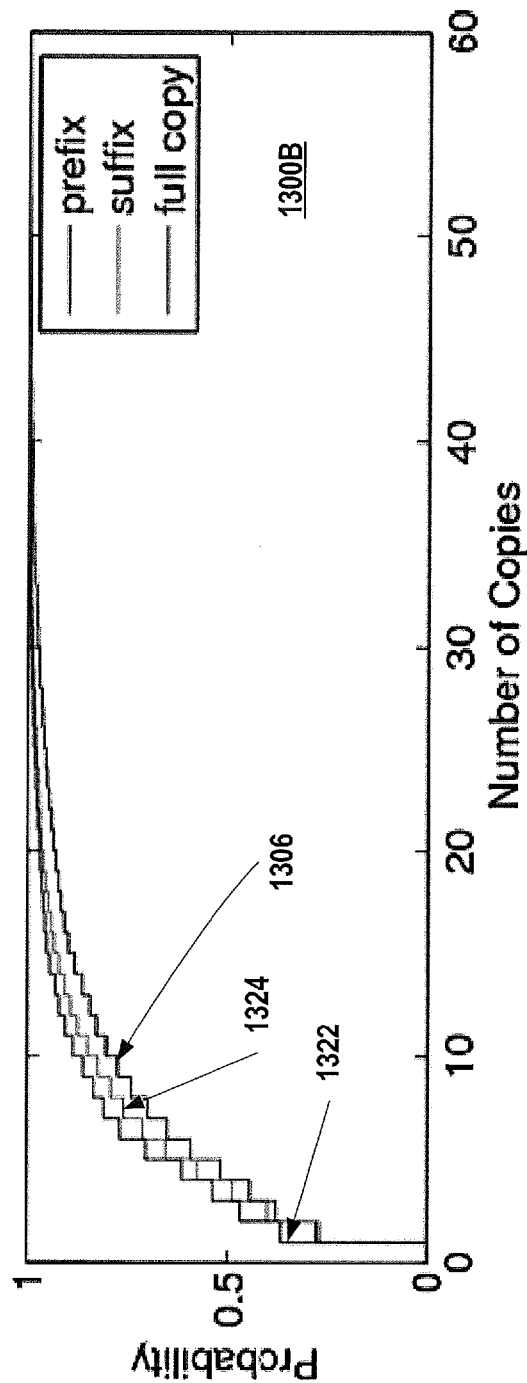
Figure 14:
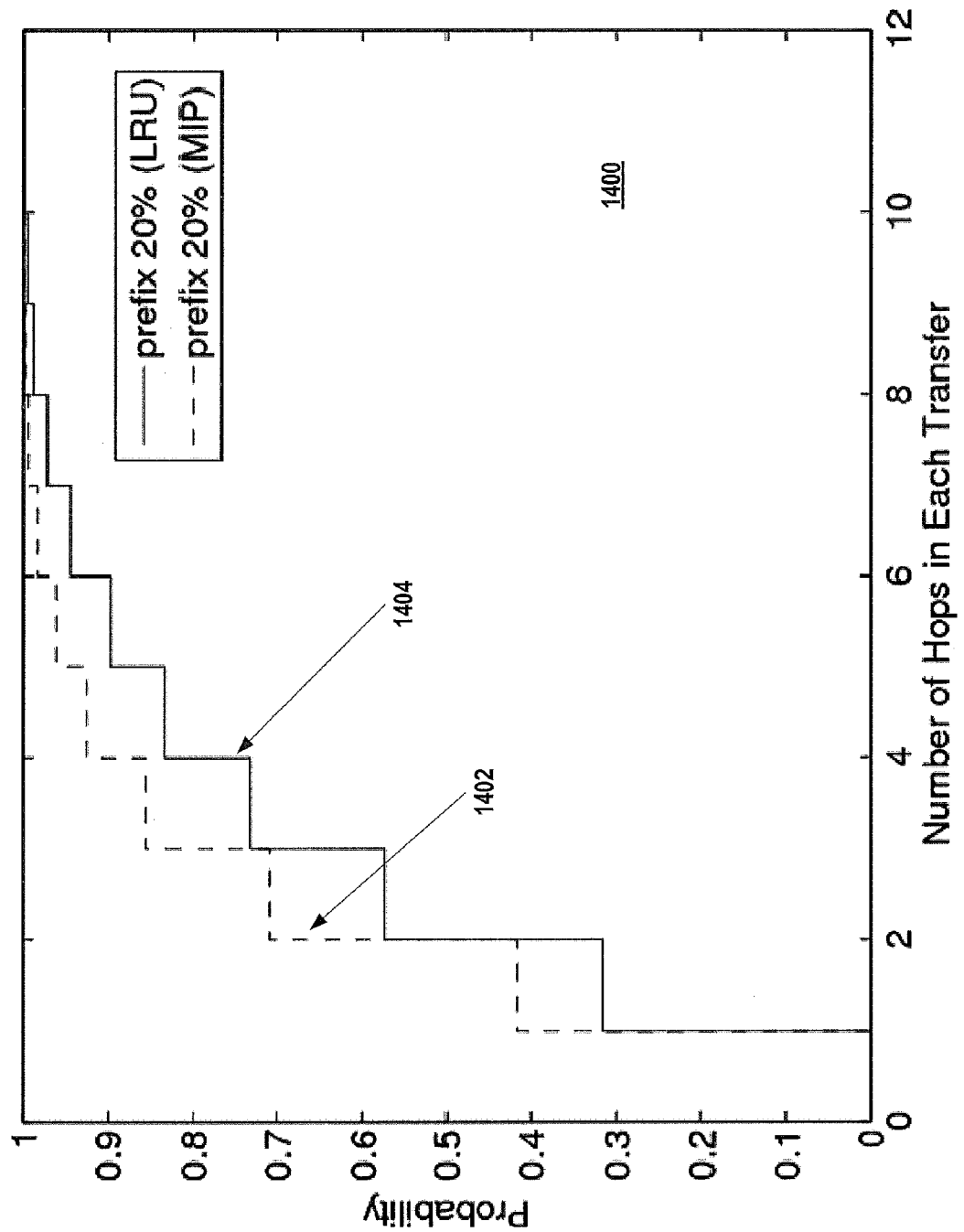
FIG. 14 is a graph of the cumulative distribution of a number of hops traversed when transferring content remotely in a particular distribution network.

Referring to FIGS. 13A and 13B, graphs of the cumulative distribution of a number of replicas created when content is placed using a MIP-based approach according to a particular embodiment are shown and designated 1300A and 1300B. When placing full videos (represented by a line 1302 in the graph 1300A and by a line 1322 in the graph 1300B), an object refers to the full videos. When placing segments, such as placing suffix segments (represented by a line 1304 in the graph 1300A and by a line 1324 in the graph 1300B) or placing prefix segments (represented by a line 1306 in the graph 1300A and by a line 1326 in the graph 1300B), an object refers to a segment. Measurements were determined when the aggregate disk space in the content distribution system was 2× and 6× the library size. The graphs 1300A and 1300B show the cumulative distribution of the number of replicas for each object type.

The graphs 1300A and 1300B indicate that the number of replicas created for prefix segments tends to be greater than that of the suffix segments, which in turn is greater than the replicas for full videos. Thus, by splitting the videos into prefix segments and suffix segments, the content placement approach is able to "pack" the videos better into the available space. Also since prefix segments receive more requests than the suffix segments, the prefix segments tend to be replicated more often. On average, there were about 2.2 replicas of a prefix segment, 1.8 replicas of a suffix segment, and 1.7 replicas of a full video.

The graphs 1300A and 1300B also indicate that the content placement approach disclosed adjusts to the available space by placing the objects better. When the total disk space is only 2× the library size (as illustrated in the graph 1300A), the content placement approach does not create a replica in all the 59 VHOs even for the most popular object. Instead the most number of replicas for an object was only 25. More than 60% of all objects had only one replica. When the disk space increases to 6× the library size (as illustrated in the graph 1300B), the content placement solution takes advantage of this extra space and places additional copies of the popular objects. A greater spread in the number of copies of each object can be seen in the graph 1300B, with 50% of the objects having between 2 to 15 replicas. This result shows an important aspect of videos and the need for the MIP based solution: with videos, despite the skew in popularity, there is a large set that is requested enough number of times that they cannot be ignored. Naive schemes, like replicating top K videos in all locations and having a single copy of others, may not be sufficient. The spread in the number of copies shows that a systematic approach, such as the MIP-based approaches disclosed herein, to optimally place videos may provide considerable benefit.

Effectiveness of the placement was studied by comparing a number of hops traversed by objects whenever a remote transfer was required to serve the object. For this study, disk space allocated was 2× the library size. Results are plotted in graph 1400 of FIG. 14. The graph 1400 indicates that MIP based approaches (represented by a line 1402) consistently result in a smaller number of hops than the caching based approaches (represented by a line 1404). Recall that for the caching solutions an idealized scenario was assumed where a perfect directory server can locate the nearest location that is storing a requested object. Thus, the caching approaches have the most up-to-date view of which location is storing what content. Despite this, over 90% of the transfers in the MIP-based scheme traverse at most four hops, whereas with caching based solutions only 80% of the requests do so. The average number of hops in the MIP based approach was 2.1 while the average number of hops in the caching approach was 2.8 hops. This, along with the result shown in FIGS. 13A and 13B, indicate that the MIP approach does an effective job of placing objects close to where they are needed.

The LRU-p approach and MIP-p approach may uses caches equaling between about 50% and 5% of the space at each VHO. A study was performed to determine how placement affected the performance of these caches. The study looked at a number of remote transfers (which are equivalent to cache misses), a number of cache evictions and a number of failed cache insertions. Instead of counting the number of occurrences, the study looked at each of the above factors in terms of terabytes (TB) of data in order to account for the heterogeneity in object sizes. Table 1 shows results of this study.

TABLE 1

Cache dynamics for LRU-p and MIP-p in terms of size.

|  | LRU-p | MIP-p |
| --- | --- | --- |
| Remote Transfer | 1805 TB | 1601 TB |
| Cache Replacement | 365 | 150 |
| Failed Insertions | 1451 | 1502 |

The results indicate that intelligent placement and use of complementary cache in the MIP-p approach resulted in fewer bytes transferred (by about 200 TB). The results also show differences in cache evictions and failed insertions. A failed insertion occurs when there is insufficient space in a cache and none of the exiting objects can be evicted because they are being used. It is of particular significance with videos because it means that all of the work done in transferring the object will have to be repeated again. The results in Table 1 show that despite having ¹⁄₁₀th the cache size (5% rather than 50% cache used for the LRU-p approach), the MIP-p caches resulted in 50% fewer evictions and approximately the same number of failed insertions, when compared to LRU-p caches. This result indicates that the LRU cache in MIP-p approach is effectively being used. That is, objects in the cache are used and hence cannot be evicted (resulting in high miss rate). In a particular embodiment, the storage at each VHO may be partitioned differently by assigning a slightly larger cache.

Figure 15:
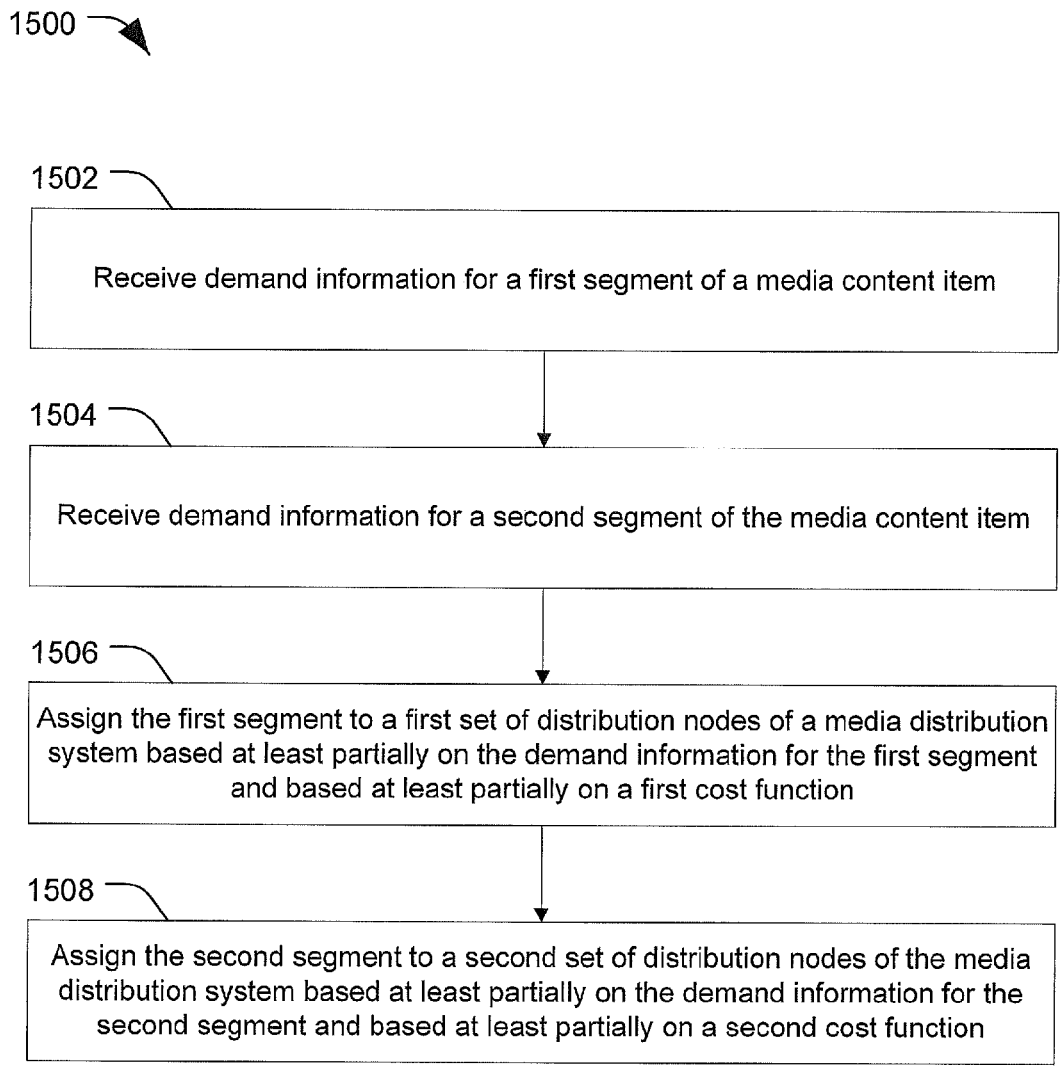
FIG. 15 is a flow chart of a first particular embodiment of a method of content placement.

Referring to FIG. 15, a flow chart of a particular embodiment of a method of assigning one or more segments is illustrated and generally designated 1500. In an illustrative embodiment, the method 1500 may be performed at the media content distribution system 100 of FIG. 1 or the media content distribution system 200 of FIG. 2.

The method 1500 may include receiving demand information for a first segment of a media content item, at 1502. For example, the first segment may be prefix segment 120A of the media content item 120 of FIG. 1. The method 1500 may also include receiving demand information for a second segment of the media content item, at 1504. For example, the second segment may be suffix segment 120B of the media content item 120 of FIG. 1.

The method 1500 may further include assigning the first segment to a first set of distribution nodes of a media content distribution system based at least partially on the demand information for the first segment and based at least partially on a first cost function, at 1506. For example, the first set of distribution nodes may include VHOs 140, 160, 170 of the media content distribution system 100 of FIG. 1 or the media content distribution system 200 of FIG. 2. The cost function may include a mixed integer program (MIP) model, such as the MIP-p approach described above. The method 1500 may further include assigning the second segment to a second set of distribution nodes of a media content distribution system based at least partially on the demand information for the second segment and based at least partially on a second cost function, at 1508. For example, the second set of distribution nodes may include VHO 160 of the media content distribution system 100 of FIG. 1 or the media content distribution system 200 of FIG. 2.

Figure 16:
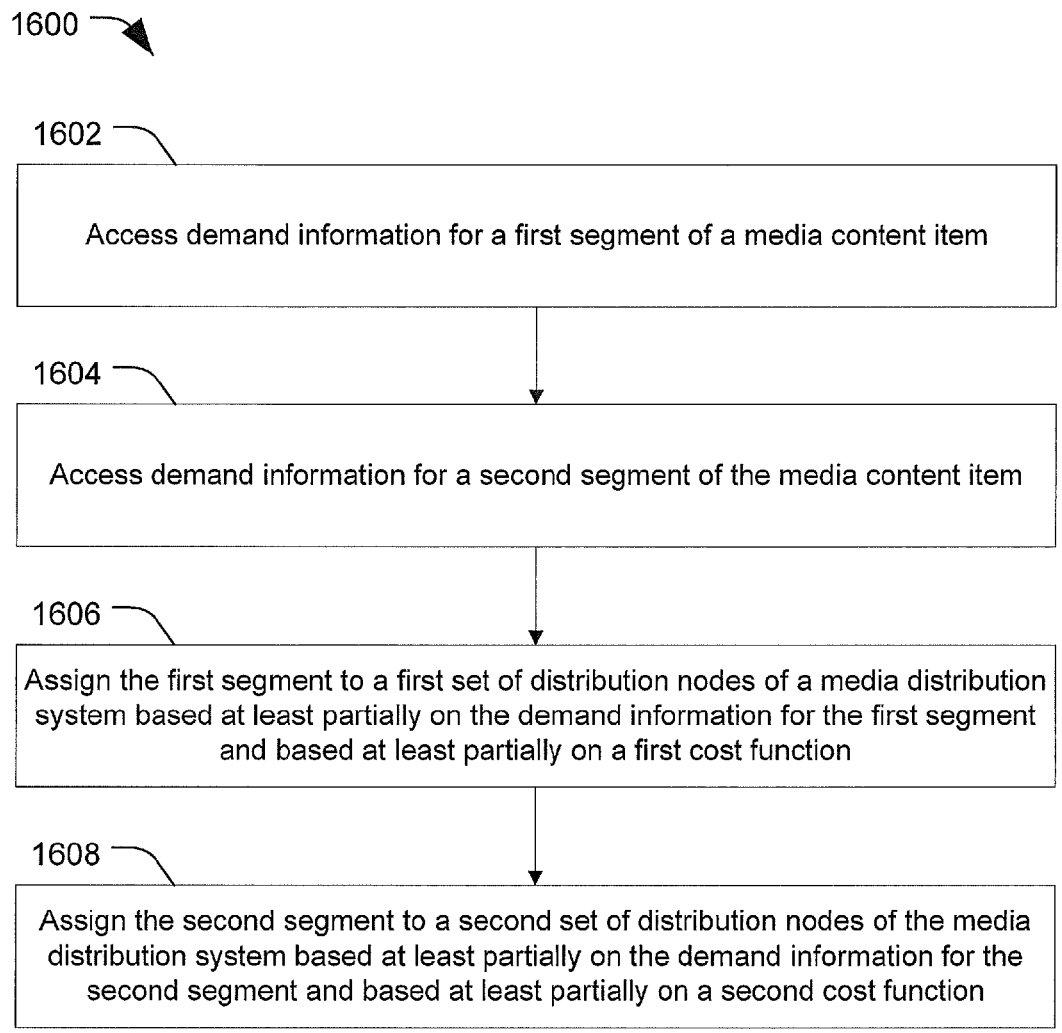
FIG. 16 is a flow chart of a second particular embodiment of a method of content placement.

Referring to FIG. 16, a flow chart of another particular embodiment of a method of assigning one or more segments is illustrated and generally designated 1600. In an illustrative embodiment, the method 1600 of FIG. 16 may be performed at the media content distribution system 100 of FIG. 1 or the media content distribution system 200 of FIG. 2.

The method 1600 may include accessing demand information for a first segment of a media content item, at 1602. For example, the first segment may be prefix segment 120A of the media content item 120 of FIG. 1. The method 1600 may also include accessing demand information for a second segment of the media content item, at 1604. For example, the second segment may be suffix segment 120B of the media content item 120 of FIG. 1.

The method 1600 may further include assigning the first segment to a first set of distribution nodes of a media content distribution system based at least partially on the demand information for the first segment and based at least partially on a first cost function, at 1606. For example, the first set of distribution nodes may include VHOs 140, 160, 170 of the media content distribution system 100 of FIG. 1 or the media content distribution system 200 of FIG. 2. The cost function may include a mixed integer program (MIP) model, such as the MIP-p approach described above. The method 1600 may further include assigning the second segment to a second set of distribution nodes of a media content distribution system based at least partially on the demand information for the second segment and based at least partially on a second cost function, at 1608. For example, the second set of distribution nodes may include VHO 160 of the media content distribution system 100 of FIG. 1 or the media content distribution system 200 of FIG. 2.

Figure 17:
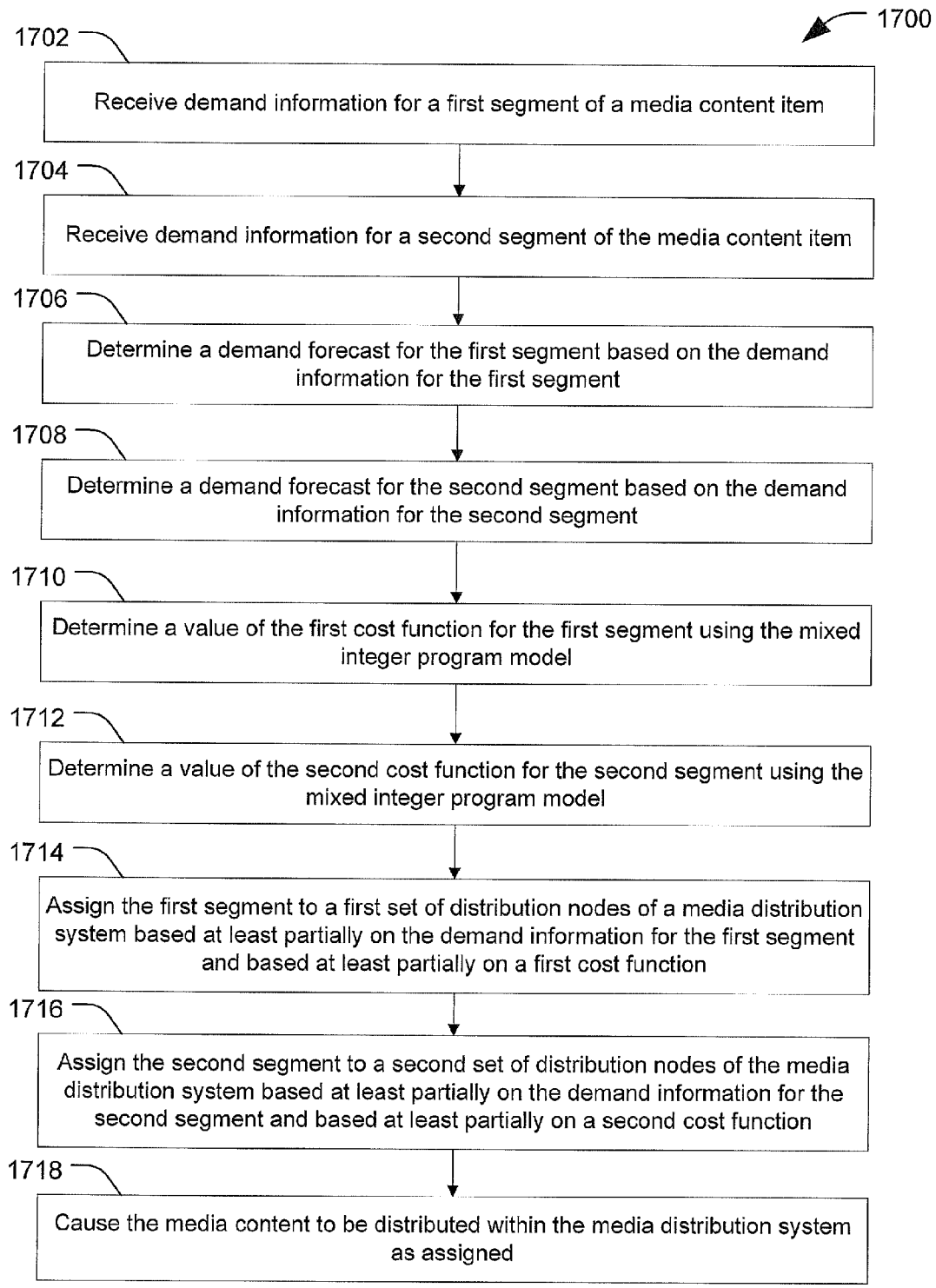
FIG. 17 is a flow chart of a third particular embodiment of a method of content placement.

Referring to FIG. 17, a flow chart of another particular embodiment of a method of assigning one or more segments is illustrated and generally designated 1700. In an illustrative embodiment, the method 1700 of FIG. 17 may be performed at the media content distribution system 100 of FIG. 1 or the media content distribution system 200 of FIG. 2.

The method 1700 may include receiving demand information for a first segment of a media content item, at 1702. For example, the first segment may be prefix segment 120A of the media content item 120 of FIG. 1. The method 1700 may also include receiving demand information for a second segment of the media content item, at 1704. For example, the second segment may be suffix segment 120B of the media content item 120 of FIG. 1.

The method 1700 may further include determining a demand forecast for the first segment based on the demand information for the first segment, at 1706. For example, the demand information for the first segment may correspond to the data 220 of the table 211A of FIG. 2 and the demand forecast for the first segment may correspond to the data 222 of the table 211A of FIG. 2. In an illustrative embodiment, the demand forecast for the first segment may be determined by the segment placement logic 108 of FIG. 1 or FIG. 2. The method 1700 may further include determining a demand forecast for the second segment based on the demand information for the second segment, at 1708. For example, the demand information for the second segment may correspond to the data 224 of table 211A of FIG. 2 and the demand forecast for the second segment may correspond to the data 226 of the table 211A of FIG. 2. In an illustrative embodiment, the demand forecast for the second segment may be determined by the segment placement logic 108 of FIG. 1 or FIG. 2.

The method 1700 may further include determining a value of a first cost function for the first segment using a mixed integer program model, at 1710. For example, the value of the first cost function may be included in the data 222 of the table 211A of FIG. 2. In an illustrative embodiment, the value of the first cost function may be determined by the segment placement logic 108 of FIG. 1 or FIG. 2 and stored at the demand database 211 of FIG. 2 as part of the data 222. The method 1700 may further include determining a value of a second cost function for the second segment using the mixed integer program model, at 1712. For example, the value of the second cost function may be included in the data 226 of the table 211A of FIG. 2. In an illustrative embodiment, the value of the second cost function may be determined by the segment placement logic 108 of FIG. 1 or FIG. 2 and stored at the demand database 211 of FIG. 2 as part of the data 226.

The method 1700 may further include assigning the first segment to a first set of distribution nodes of a media content distribution system based at least partially on the demand information for the first segment and based at least partially on the first cost function, at 1714. For example, the first set of distribution nodes may include VHOs 140, 160, 170 of the media content distribution system 100 of FIG. 1 or the media content distribution system 200 of FIG. 2. The method 1700 may further include assigning the second segment to a second set of distribution nodes of the media content distribution system based at least partially on the demand information for the second segment and based at least partially on the second cost function, at 1716. For example, the second set of distribution nodes may include VHO 160 of the media content distribution system 100 of FIG. 1 or the media content distribution system 200 of FIG. 2.

The method 1700 may also include, at 1718, causing media content to be distributed within the media content distribution system as assigned. For example, the segment placement logic 108 of FIG. 1 may determine which segments are already stored (either in pre-assigned storage or in cache) at storage locations to which the segments are assigned. When the segment placement logic 108 identifies a particular segment that is assigned to a particular distribution node that is not currently stored at the particular distribution node, the segment placement logic 108 may send the particular segment to the particular distribution node. Alternately, the segment placement logic 108 may cause the particular segment to be sent to the particular distribution node. For example, the segment placement logic 108 may request that another distribution node sends a copy of the particular segment to the particular distribution node. In another example, the segment placement logic 108 may send a message to the particular distribution node. The message may indicate that the particular segment is assigned to particular distribution node and that if the particular distribution node receives a copy of the particular segment (e.g., as a result of a cache miss), the particular distribution node is to store the particular segment in pre-assigned storage (rather than or in addition to cache).

Figure 18:
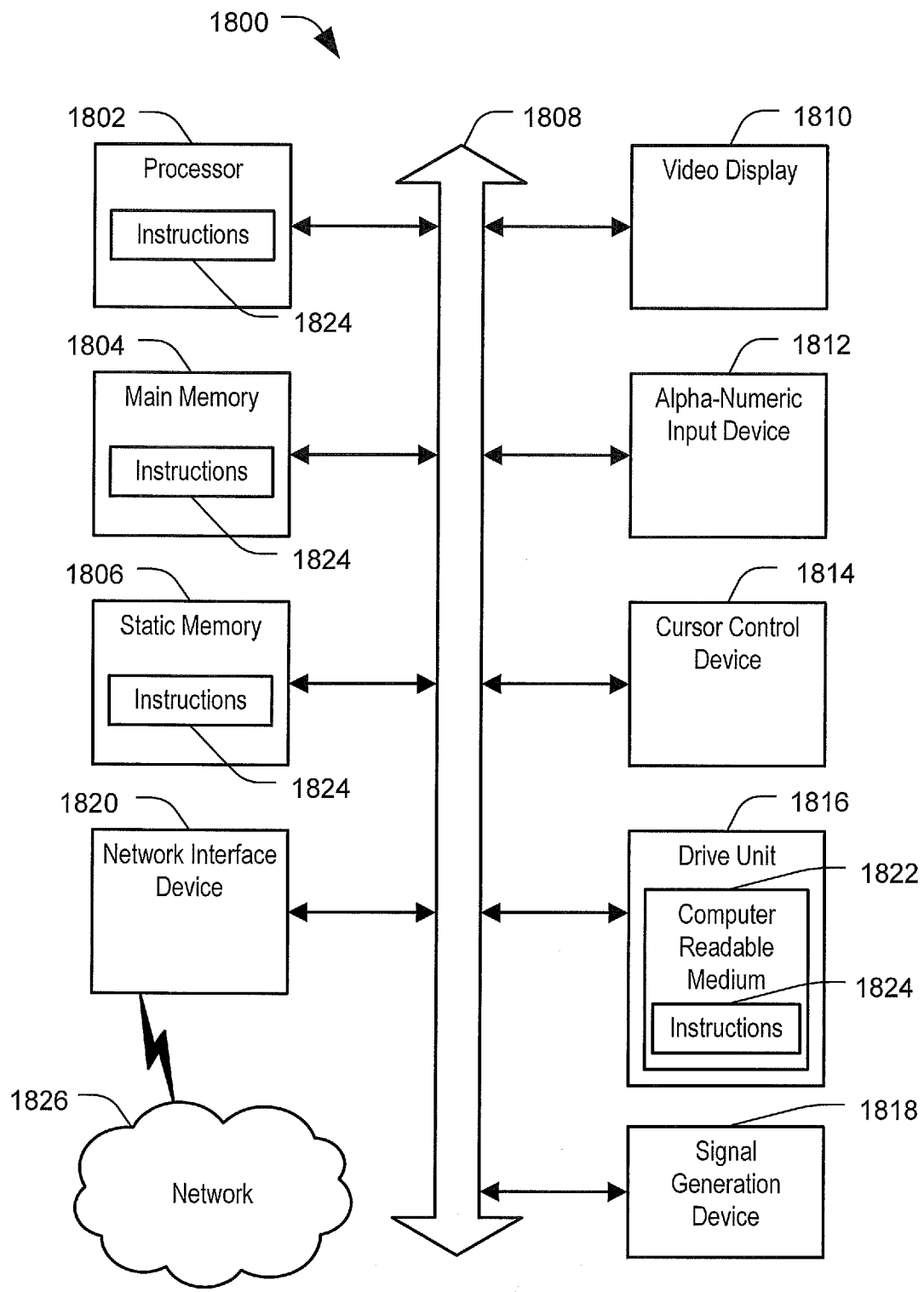
FIG. 18 is an illustration of a particular embodiment of a general computer system.

Referring to FIG. 18, an illustrative embodiment of a general computer system according to a particular embodiment is shown and designated 1800. The computer system 1800 can include a set of instructions that can be executed to cause the computer system 1800 to perform any one or more of the methods or computer based functions disclosed herein. The computer system 1800 may operate as a standalone device or may be connected, e.g., using a network, to other computer systems or peripheral devices. For example, the general computer system 1800 may include or be included within any one or more of the SHOs, VHOs, routers, metro intermediate offices, video serving offices, digital subscriber loop access multiplexers, residential gateways, set-top boxes of FIG. 1 or other computing systems that determine placement of content in the media content distribution system 100 of FIG. 1.

In a networked deployment, the computer system 1800 may operate in the capacity of a server or as a client user computer in a server-client user network environment, or as a peer computer system in a peer-to-peer (or distributed) network environment. The computer system 1800 can also be implemented as or incorporated into various devices, such as a personal computer (PC), a tablet PC, a set-top box (STB), a personal digital assistant (PDA), a mobile device, a palmtop computer, a laptop computer, a desktop computer, a control system, a network router, switch or bridge, or any other machine capable of executing a set of instructions (sequential or otherwise) that specify actions to be taken by that machine. In a particular embodiment, the computer system 1800 can be implemented using electronic devices that provide voice, video or data communication. Further, while a single computer system 1800 is illustrated, the term "system" shall also be taken to include any collection of systems or sub-systems that individually or jointly execute a set, or multiple sets, of instructions to perform one or more computer functions.

As illustrated in FIG. 18, the computer system 1800 may include a processor 1802, e.g., a central processing unit (CPU), a graphics processing unit (GPU), or both. Moreover, the computer system 1800 can include a main memory 1804 and a static memory 1806, that can communicate with each other via a bus 1808. As shown, the computer system 1800 may further include a video display unit 1810, such as a liquid crystal display (LCD), an organic light emitting diode (OLED), a flat panel display, or a solid state display. Additionally, the computer system 1800 may include an input device 1812, such as a keyboard, and a cursor control device 1814, such as a mouse. The computer system 1800 can also include a disk drive unit 1816, a signal generation device 1818, such as a speaker or remote control, and a network interface device 1820.

In a particular embodiment, as depicted in FIG. 18, the disk drive unit 1816 may include a computer-readable medium 1822 in which one or more sets of instructions 1824, e.g., software, can be embedded. Further, the instructions 1824 may embody one or more of the methods or logic as described herein. In a particular embodiment, the instructions 1824 may reside completely, or at least partially, within the main memory 1804, the static memory 1806, and/or within the processor 1802 during execution by the computer system 1800. The main memory 1804 and the processor 1802 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

While the computer-readable medium 1822 is shown to be a single medium, the term "computer-readable medium" includes a single medium or multiple media, such as a centralized or distributed database, and/or associated caches and servers that store one or more sets of instructions. The term "computer-readable medium" shall also include any tangible, non-transitory medium that is capable of storing or encoding a set of instructions for execution by a processor or that cause a computer system to perform any one or more of the methods or operations disclosed herein.

In a particular non-limiting, exemplary embodiment, the computer-readable medium 1822 can include a solid-state memory such as a memory card or other package that houses one or more non-volatile read-only memories. Further, the computer-readable medium 1822 can be a random access memory or other volatile re-writable memory. Additionally, the computer-readable medium 1822 can include a magneto-optical or optical medium, such as a disk or tapes or other storage device. Accordingly, the disclosure is considered to include any one or more of a non-transitory computer-readable storage medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the drawings are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the disclosure. Thus, to the maximum extent allowed by law, the scope of the disclosure is to be determined by the broadest permissible interpretation of the following claims and their equivalents, and shall not be restricted or limited by the foregoing detailed description.

What is claimed is:

1. A computer-implemented method, comprising:
   determining a playing length of a media content item;
   separating the media content item into a first segment and a second segment in response to determining that the playing length is greater than a first threshold;
   receiving demand information for the first segment; receiving demand information for the second segment;
   assigning the first segment to a first set of distribution nodes of a media content distribution system based at least partially on the demand information for the first segment and based at least partially on a first cost function, wherein the media content distribution system provides media content on demand to a plurality of endpoints, wherein the media content distribution system includes a plurality of distribution nodes with each of the distribution nodes coupled to a subset of the endpoints, and wherein the first cost function accounts for a first plurality of constraints; and
   assigning the second segment to a second set of distribution nodes of the media content distribution system based at least partially on the demand information for the second segment and based at least partially on a second cost function, wherein the second set of distribution nodes includes a different number of distribution nodes than the first set of distribution nodes, wherein the first cost function is distinct from the second cost function, wherein the second cost function accounts for a second plurality of constrains, and wherein at least one constraint of the second plurality of constraints is distinct from the first plurality of constraints.

2. The method of claim 1, further comprising:
determining a demand forecast for the first segment based on the demand information for the first segment, wherein the demand forecast for the first segment includes a demand value for the first segment, and wherein the demand information for the first segment includes historical demand information for the first segment; and
determining a demand forecast for the second segment based on the demand information for the second segment, wherein the demand forecast for the second segment includes a demand value for the second segment, and wherein the demand information for the second segment includes historical demand information for the second segment.

3. The method of claim 1, wherein the first cost function is a prefix based mixed integer program function.

4. The method of claim 1, wherein the first segment comprises a percentage of the media content item, and wherein the percentage is based on a predicted number of total bytes transferred.

5. The method of claim 1, wherein the first segment comprises a percentage that is based on a type of content of the media content item, and wherein the type of content indicates whether the media content is a television show or a movie.

6. The method of claim 1, wherein the first segment comprises a portion of the media content item determined by a percentage of the media content item, wherein the percentage is based on user behavior, and wherein the user behavior includes whether users resume watching the media content item after having stopped play of the media content item.

7. The method of claim 1, wherein the first threshold is ten minutes.

8. The method of claim 1, wherein the demand information for the first segment includes historical demand information for a second media content item.

9. The method of claim 1, wherein a size of the first segment of the media content item is determined based at least partially on a type of content of the media content item.

10. The method of claim 1, further comprising:
receiving demand information for a second media content item;
determining a demand forecast for the second media content item based on the demand information for the second media content item, wherein the demand forecast for the second media content item includes a demand value for the second media content item, and wherein the demand information for the second media content item includes historical demand information for the second media content item; and
assigning the second media content item to a third set of distribution nodes of the media content distribution system based at least partially on the demand forecast for the second media content item and based at least partially on a third cost function.

11. The method of claim 10, wherein the second media content item is assigned as a single segment based on a determination that a size of the second media content item is below the first threshold.

12. The method of claim 1, wherein separating the media content item into the first segment and the second segment comprises forming a third segment of the media content item, and further comprising:
determining a forecasted demand for the third segment, wherein the first segment, the second segment, and the third segment are distinct, and wherein a first forecasted demand for the first segment and a second forecasted demand for the second segment are different than the forecasted demand for the third segment; and
assigning the third segment to a third set of distribution nodes of the media content distribution system based at least partially on the forecasted demand for the third segment and based at least partially on a third cost function, wherein the third set of distribution nodes includes a different number of distribution nodes than the first set of distribution nodes and the second set of distribution nodes based on the forecasted demand for the third segment being different than the first forecasted demand for the first segment and the second forecasted demand for the second segment.

13. A system comprising:
a processor; and
a memory accessible to the processor, the memory comprising instructions that, when executed by the processor, cause the processor to perform operations including:
determining a playing length of a media content item;
separating the media content item into a first segment and a second segment in response to determining that the playing length is greater than a first threshold;
receiving demand information for the first segment of the media content item;
receiving demand information for the second segment of the media content item, wherein the first segment and the second segment are distinct, and wherein the demand information for the first segment is different than the demand information for the second segment;
assigning the first segment to a first set of distribution nodes of a media content distribution system based at least partially on the demand information for the first segment and based at least partially on a first cost function, wherein the media content distribution system provides media content on demand to a plurality of endpoints, the media content distribution system including a plurality of distribution nodes with each of the distribution nodes coupled to a subset of the endpoints, and wherein the first cost function accounts for a first plurality of constraints; and
assigning the second segment to a second set of distribution nodes of the media content distribution system based at least partially on the demand information for the second segment and based at least partially on a second cost function, wherein the second set of distribution nodes includes a different number of distribution nodes than the first set of distribution nodes, wherein the first cost function is distinct from the second cost function, wherein the second cost function accounts for a second plurality of constraints, and wherein at least one constraint of the second plurality of constraints is distinct from the first plurality of constraints.

14. The system of claim 13, wherein the operations further comprise:
determining a demand forecast for the first segment based on the demand information for the first segment, wherein the demand forecast for the first segment includes a demand value for the first segment, and wherein the demand information for the first segment includes historical demand information for the first segment; and determining a demand forecast for the second segment based on the demand information for the second segment, wherein the demand forecast for the second segment includes a demand value for the second segment, and wherein the demand information for the second segment includes historical demand information for the second segment.

15. The system of claim 14, wherein the operations further comprise:

determining a value of the first cost function for the first segment using a mixed integer program model, wherein the first segment is assigned to the first set of distribution nodes based at least partially on the demand value for the first segment and based at least partially on the value of the first cost function for the first segment; and determining a value of the second cost function for the second segment using the mixed integer program model, wherein the second segment is assigned to the second set of distribution nodes based at least partially on the demand value for the second segment and based at least partially on the value of the second cost function for the second segment.

16. The system of claim 14, wherein a size of the first segment is determined based on the demand forecast for the first segment.

17. The system of claim 13, wherein the media content item is a video on demand content item, and wherein the media content distribution system includes a plurality of video on demand content items.

18. A computer-readable storage device comprising instructions that, when executed by a processor, cause the processor to perform operations including:

determining a playing length of media content;

separating the media content into a first segment and a second segment in response to determining that the playing length is greater than a first threshold;

assigning the first segment to a first set of distribution nodes of a media content distribution system based at least partially on a first cost function, and wherein the first cost function accounts for a first plurality of constraints;

assigning the second segment to a second set of distribution nodes of the media content distribution system based at least partially on a second cost function, wherein the first cost function is distinct from the second cost function, wherein the second cost function accounts for a second plurality of constraints, and wherein at least one constraint of the second plurality of constraints is distinct from the first plurality of constraints;

receiving a first request for the first segment in response to a second request for the media content received at a first distribution node of the media content distribution system when a cache of the first distribution node does not include the first segment; and sending the first segment to the first distribution node in response to the first request, wherein sending the first segment limits bandwidth usage of the distribution system to the first distribution node by sending only the first segment and not all of the media content to the first distribution node.

* * * * *